(12) United States Patent
Awad et al.

(10) Patent No.: US 12,245,289 B2
(45) Date of Patent: Mar. 4, 2025

(54) COMMUNICATIONS DEVICE, INFRASTRUCTURE EQUIPMENT AND METHODS FOR DIFFERENTIATING BETWEEN 2-STEP RACH AND 4-STEP RACH

(71) Applicant: Sony Group Corporation, Tokyo (JP)

(72) Inventors: Yassin Aden Awad, Basingstoke (GB); Vivek Sharma, Basingstoke (GB); Samuel Asangbeng Atungsiri, Basingstoke (GB); Yuxin Wei, Basingstoke (GB); Hideji Wakabayashi, Basingstoke (GB); Naoki Kusashima, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 339 days.

(21) Appl. No.: 17/771,506

(22) PCT Filed: Oct. 27, 2020

(86) PCT No.: PCT/EP2020/080164
§ 371 (c)(1),
(2) Date: Apr. 25, 2022

(87) PCT Pub. No.: WO2021/083886
PCT Pub. Date: May 6, 2021

(65) Prior Publication Data
US 2022/0369378 A1    Nov. 17, 2022

(30) Foreign Application Priority Data

Nov. 1, 2019  (EP) ..................................... 19206798
Dec. 17, 2019  (EP) ..................................... 19217252

(51) Int. Cl.
*H04W 74/0833*    (2024.01)
*H04W 74/0836*    (2024.01)
*H04W 74/0838*    (2024.01)

(52) U.S. Cl.
CPC .............................. *H04W 74/0833* (2013.01)

(58) Field of Classification Search
None
See application file for complete search history.

(56) References Cited

U.S. PATENT DOCUMENTS

2017/0019930 A1 *  1/2017  Lee ........................ H04W 72/21
2020/0236704 A1 *  7/2020  Chande ................. H04W 72/21
(Continued)

FOREIGN PATENT DOCUMENTS

WO    2015/137632 A1    9/2015
WO    2019/098906 A1    5/2019

OTHER PUBLICATIONS

International Search Report and Written Opinion mailed on Feb. 5, 2021, received for PCT Application PCT/EP2020/080164, Filed on Oct. 27, 2020, 16 pages.
(Continued)

*Primary Examiner* — Diane L Lo
(74) *Attorney, Agent, or Firm* — XSENSUS, LLP

(57) ABSTRACT

A method of operating a communications device in a wireless communications network comprises transmitting a random access message on a wireless access interface, the random access message comprising a selected random access preamble. The method further comprises receiving a resource allocation message comprising an indication of downlink communications resources allocated for the transmission of a random access response message combined with a radio network terminal identifier which identifies the communications device which transmitted the random
(Continued)

access message, determining that the resource allocation message identifies the communications device, and in response to determining that the resource allocation message identifies the communications device, decoding the signals transmitted using the allocated downlink communications resources.

17 Claims, 11 Drawing Sheets

(56) References Cited

U.S. PATENT DOCUMENTS

2021/0368554 A1* 11/2021 Ohseki .............. H04W 74/0841
2024/0098794 A1*  3/2024 Farag .................... H04L 5/0053

OTHER PUBLICATIONS

Qualcomm Inc., "New WID on NR-based Access to Unlicensed Spectrum", 3GPP TSG RAN Meeting #82, RP-182878, Dec. 10-13, 2018, 7 pages.
ZTE Corporation et al., "New work item: 2-step RACH for NR", 3GPP TSG RAN Meeting #82, RP-182894, Dec. 10-13, 2018, 5 pages.
Ericsson, "Procedure for Cross-Slot Scheduling technique", 3GPP TSG-RAN WG1 Meeting #97, Tdoc R1-1907323, May 13-17, 2019, pp. 1-5.
3GPP, "NR; Multiplexing and channel coding", ETSI TS 138 212 V15.6.0, Jul. 2019, pp. 1-105.
3GPP, "NR; Physical layer procedures for data", ETSI TS 138 214 V15.6.0, Jul. 2019, pp. 1-107.
3GPP, "NR; NR and NG-RAN Overall Description; Stage 2 (Release 15)", 3GPP TS 38.300 V15.4.0, Dec. 2018, pp. 1-97.
3GPP, "NR; Medium Access Control (MAC) protocol specification", 3GPP TS 38.321 V15.6.0, Jun. 2019, pp. 1-78.
3GPP, "Medium Access Control (MAC) protocol specification (Release 15)", 3GPP TS 38.321 V15.3.0, Sep. 2018, pp. 1-76.
3GPP, "NR;Medium Access Control (MAC) protocol specification(Release 15)", 3GPP TS 38.321 V15.4.0, Dec. 2018, pp. 1-77.
3GPP, "LTE; Evolved Universal Terrestrial Radio Access (E-UTRA); Physical layer procedures", ETSI TS 136 213 V13.0.0, May 2016, pp. 1-327.
Holma et al., "LTE for UMTS OFDMA and SC-FDMA Based Radio Access", John Wiley & Sons, 2009, pp. 25-27.
Nokia et al., "Revised SID: Study on NR Industrial Internet of Things (IoT)", 3GPP TSG RAN meeting #81, RP-182090, Sep. 10-13, 2018, 5 pages.
3GPP, "NR; Physical channels and modulation (Release 15)", 3GPP TS 38.211 V15.4.0, Dec. 2018, pp. 1-96.

* cited by examiner 4-step RACH and 2-step RACH having same starting OFDM symbol 4-step RACH with multiple PRACH occasions within a slot Example of Slots of uplink with PRACH occasions within a radio frame (subcarrier spacing of 15KHZ)

COMMUNICATIONS DEVICE, INFRASTRUCTURE EQUIPMENT AND METHODS FOR DIFFERENTIATING BETWEEN 2-STEP RACH AND 4-STEP RACH

CROSS-REFERENCE TO RELATED APPLICATIONS

The present application is based on PCT filing PCT/EP2020/080164, filed Oct. 27, 2020, which claims priorities to European Patent application Nos. 19206798.1, filed Nov. 1, 2019, and 19217252.6, filed Dec. 17, 2019, the entire contents of each are incorporated herein by reference.

BACKGROUND

Field

The present disclosure relates to communications devices, infrastructure equipment and methods for communicating data in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) services are for a reliability of $1-10^{-5}$ (99.999%) or higher for one transmission of a 32 byte packet with a user plane latency of 1 ms [3]. In addition, systems may be expected to support further enhancements related to Industrial Internet of Things (IIoT) in order to support services with new requirements of high availability, high reliability, low latency, and in some cases, high-accuracy positioning.

Industrial automation, energy power distribution and intelligent transport systems are examples of new use cases for Industrial Internet of Things (IIoT). In an example of industrial automation, the system may involve different distributed components working together. These components may include sensors, virtualized hardware controllers and autonomous robots, which may be capable of initiating actions or reacting to critical events occurring within a factory and communicating over a local area network.

The UEs in the network may therefore be expected to handle a mixture of different traffic, for example, associated with different applications and potentially different quality of service requirements (such as maximum latency, reliability, packet sizes, throughput). Some messages for transmission may be time sensitive and be associated with strict deadlines and the communications network may therefore be required to provide time sensitive networking (TSN) [6].

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Embodiments of the present technique can provide a method of operating a communications device in a wireless communications network, the method comprising transmitting a random access message on a wireless access interface, the random access message comprising a selected random access preamble. In some examples the preamble may be followed by transmitting uplink data on communications resources of a shared channel, the communications resources of the shared channel being determined from the transmission of the random access message. In other examples the random access message may comprise only the preamble, which may form a message B of a two-step random access process. The method further comprises receiving a resource allocation message comprising an indication of downlink communications resources allocated for the transmission of a random access response message combined with a radio network terminal identifier which identifies the communications device which transmitted the random access message, determining that the resource allocation message identifies the communications device, and in response to determining that the resource allocation message identifies the communications device, receiving and decoding the signals transmitted using the allocated downlink communications resources. The determining that the resource allocation message identifies the communications device comprises calculating the radio network terminal identifier which is used in the resource allocation message to identify the communications device using an offset, and confirming that the calculated radio network terminal identifier corresponds with the radio network terminal identifier present in the resources allocation message. In some examples the offset is combined with a parameter which is used for calculating the radio network temporary identifier according to a conventional technique, which depends on a time of transmission of the random access message so that the offset can generate a radio network temporary identifier for a communications device performing a two-step random access procedure which is different and distinguished from a radio network temporary identifier directed for another communications device such as one performing a four-step random access procedure at the same time.

According to another aspect, embodiments of the present technique can also provide a method of operating an infrastructure equipment in a wireless communications network, the method comprising receiving a first random access message on a wireless access interface provided by the infrastructure equipment from a first communications device, the first random access message comprising a first random access preamble, receiving uplink data on communications resources of a shared channel from the first communications device, the communications resources of the shared channel being determined from the transmission of the first random access message, and receiving a second random access message on a wireless access interface provided by the infrastructure equipment from a second communications device, the second random access message comprising a second random access preamble. Therefore the infrastructure equipment can receive two random access messages, which may require, under certain conditions an arrangement for differentiating between the two different communications devices in response. Accordingly embodiments further include transmitting a first resource allocation message to the first communications device, the first resource allocation message comprising an indication of downlink communications resources allocated for the transmission of a first random access response message combined with a first radio network terminal identifier which identifies the first communications device which transmitted the first random access message, and transmitting a second resource allocation message to the second communications device, the second resource allocation message comprising an indication of downlink communications resources allocated for the transmission of a second random access response message combined with a second radio network terminal identifier which identifies the second communications device which transmitted the second random access message. The transmitting the first resource allocation message to the first communications device includes calculating a first radio network terminal identifier which is used in the first resource allocation message to identify the communications device using an offset to distinguish the first radio network terminal identifier from a second terminal identifier to identify the second communications device, and transmitting the first resource allocation message to the first communications device.

According to some examples, one communications device may perform a two-step random access process whereas another communications device may perform a four-step random access process. If both of the communications devices transmit the random access messages in the same time slot, but on different frequencies, then there is a potential for the same radio network temporary identifier to be generated for identifying both of the communications devices leading to ambiguity and a breakdown in these random access processes. If the communications device performing the four-step process is a legacy or conventional communications device, which must be backwardly compatible with existing systems, then no changes in the generation of the radio network temporary identifier can be made. Embodiments can therefore provide for an offset to be introduced when calculating the radio network temporary identifier for the two-step random access which can therefore be used by a communications device performing the two-step random access process to be identified separately from a communications device performing the four-step random access process.

In other examples, a radio network temporary identifier can be calculated with an offset to separate communications devices which are preforming contention free or contention based random access or system information (SI) request.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
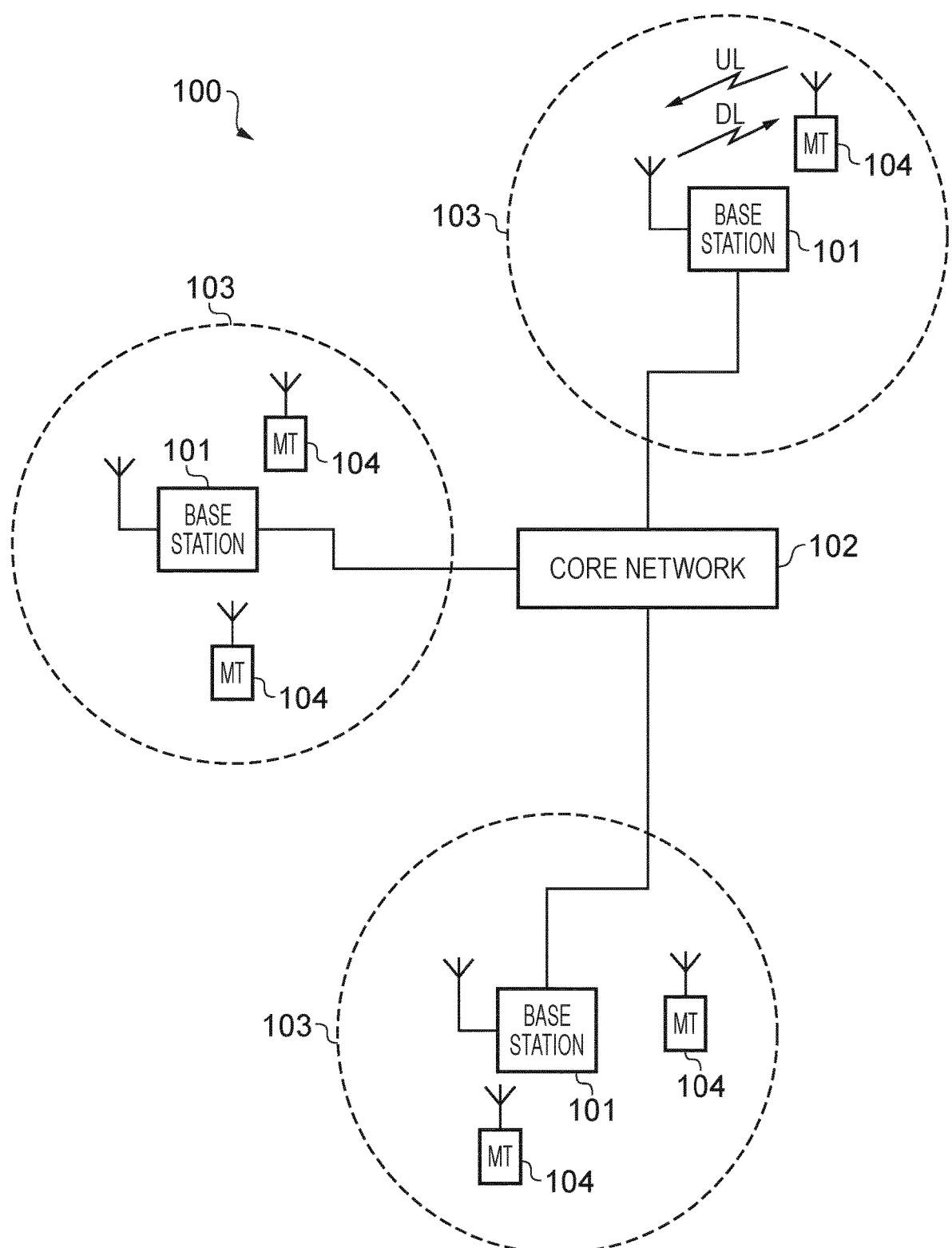
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
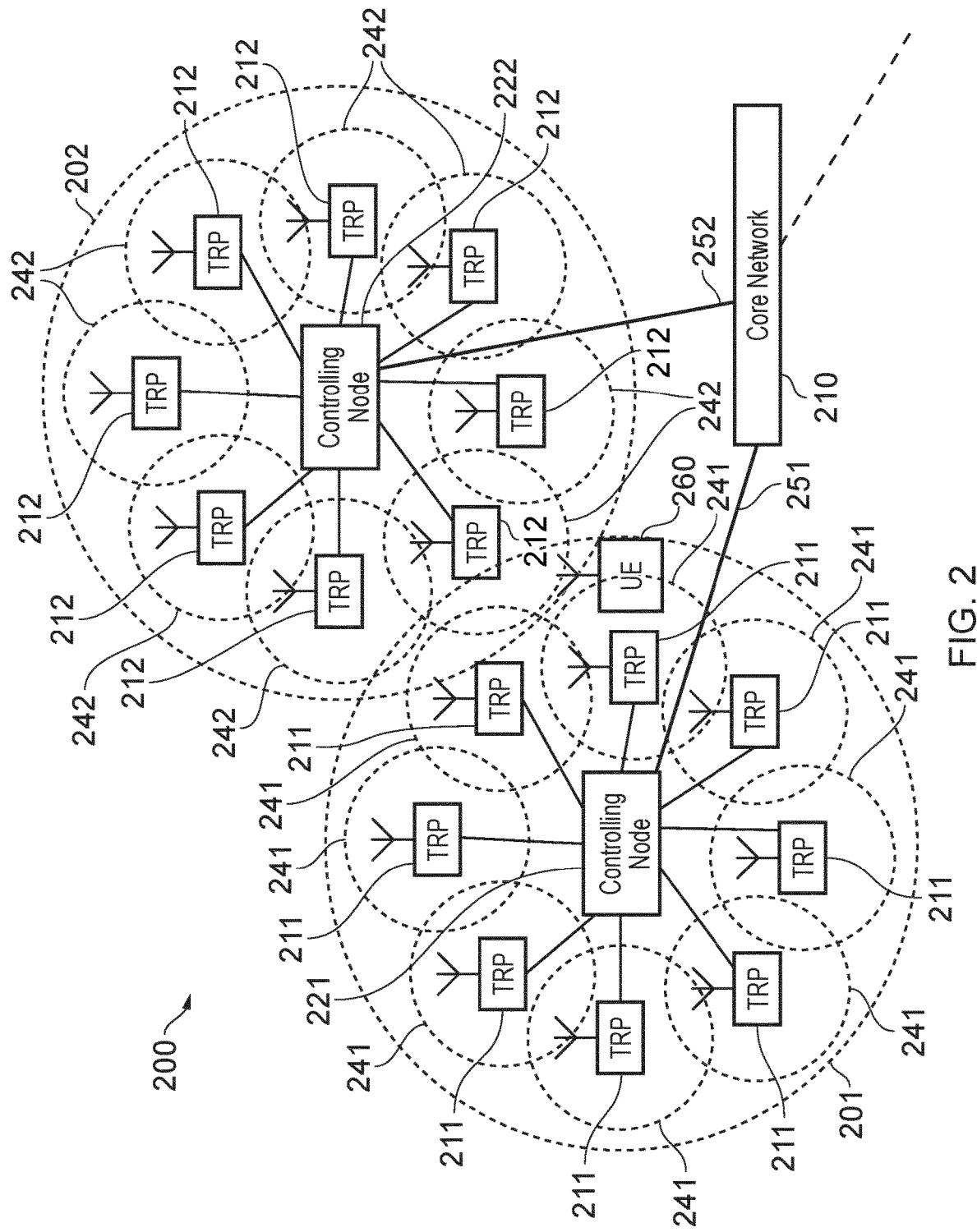
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated that in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated that the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
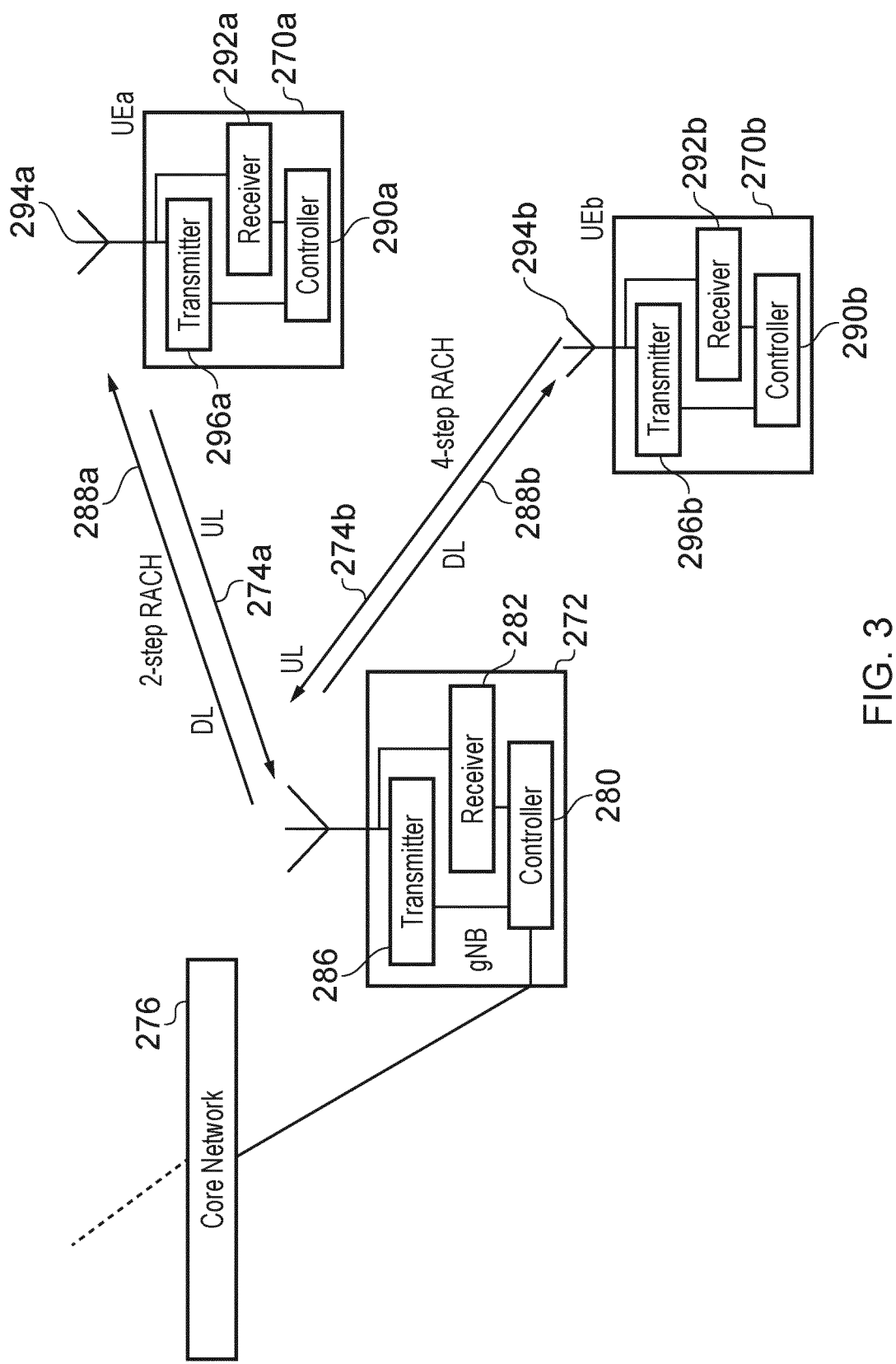
FIG. 3 is a schematic block diagram of an example infrastructure equipment and two communications device one of which is performing a conventional four-step RACH procedure and the other is performing a two-step RACH procedure which may be configured in accordance with example embodiments.

A more detailed illustration of two UEs/communications devices 270a, 270b is provided in FIG. 3. As will be explained below, FIG. 3 provides an illustration of an example embodiment in which an NR UE, UEa 270a, which may correspond to a communications device such as the communications device 260 of FIG. 2 performs a two step RACH procedure and a second UE, UEb 270b which may be a conventional or legacy UE such as the communications device 104 of FIG. 1 performs a four step RACH procedure. It will be appreciated however that two-step and four-step RACH may be performed by either a conventional/legacy UE or a NR/5G UE. For example a UE may fall-back to a four-step RACH if a two-step RACH fails. Both UEa 270a and UEb 270b transmit signals on an uplink UL and receive signals on a downlink DL from an example network infrastructure equipment 272, which may be thought of as a gNB 101 or a combination of a controlling node 221 and TRP 211. The UEa 270a and UEb 270b are shown to transmit uplink data to the infrastructure equipment 272 via uplink resources UL of a wireless access interface as illustrated generally by arrows 274a, 274b to the infrastructure equipment 272. The UEa 270a and the UEb 270b may similarly be configured to receive downlink data transmitted by the infrastructure equipment 272 via downlink resources DL as indicated by arrows 288a, 288b from the infrastructure equipment 272 to the UEa 270a and the UEb 270b. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, both of the UEa 270a and the UEb 270b include a controller 290a, 290b connected to a receiver 292a, 292b which receives signals from an antenna 294a, 294b and a transmitter 296a, 296b also connected to the antenna 294a, 294b.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290a, 290b of the UEa 270a and the UEb 270b is configured to control the transmitter 296a, 296b and the receiver 292a, 292b and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitters 296a, 296b, receivers 292a, 292b and controllers 290a, 290b are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications devices 270a, 270b will in general comprise various other elements associated with its operating functionality, for example a power source, user interface, and so forth, but these are not shown in FIG. 3 in the interests of simplicity.

The controllers 280, 290a, 290b may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Figure 4:
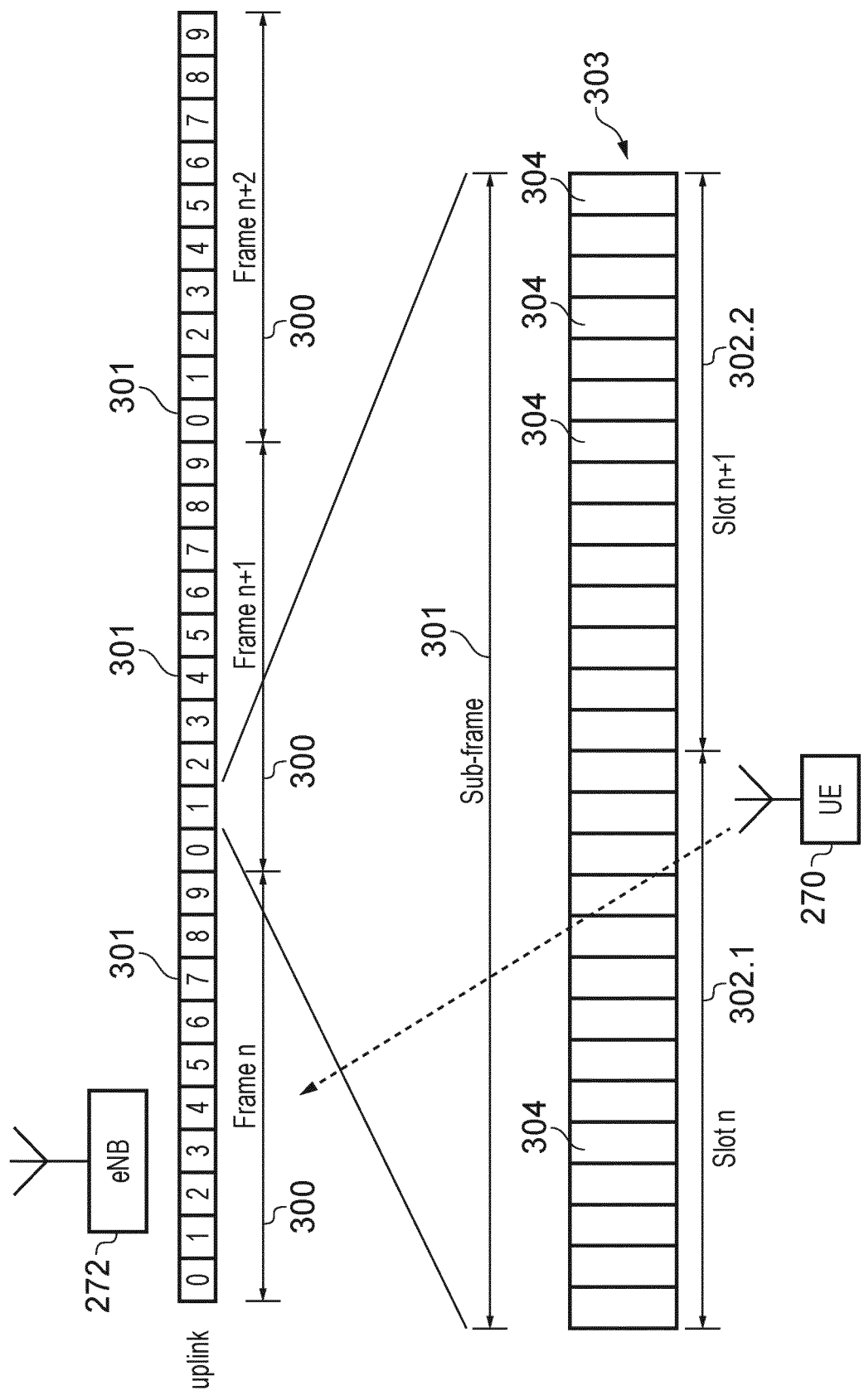
FIG. 4 is a schematic illustration of a simplified representation of a downlink of a wireless access interface shown in FIG. 1 illustrating a frame, sub-frame and time slot structure of time divided units of the wireless access interface.

FIG. 4 provides a simplified representation of an uplink structure of a wireless access interface with time divided units which may be used for a NR wireless access interface structure. Whilst the terms "frames" and "sub-frames" used in FIG. 4 are terms which have been used in LTE, 3GPP standards adopted for 5G/NR may be different and so it will be appreciated that FIG. 4 is provided for illustration only to assist in the explanation of the example embodiments. Current proposals for a time divided structure for 5G/NR include that one slot providing a time divided structure of the wireless access interface consists of 14 OFDM symbols 304, and one sub-frame is defined by 1 ms. The term slot is used in this description to refer to a time slot or time divided unit and time slot and slot may be used interchangeably. As such, the time divided structure of the wireless access interface of FIG. 4 shows an example in which one sub-frame 301 has two slots 302.1, 302.2 and twenty eight symbols. As shown in FIG. 4, the uplink of the wireless access interface is shown to comprise frames 300 with respect to which the UE 270 transmits to the infrastructure equipment 272. The uplink comprises, in each frame, 300 ten sub-frames 301. A frame 300 is defined by 10 ms, a sub-frame 301 is defined by 1 ms, and a slot 302 is defined by fourteen OFDM symbols 304, irrespective of subcarrier spacing. An expanded view of the components of a sub-frame 301 are shown to be formed from two consecutive slots n–1, n 302.1, 302.2, which include physical resources of a shared channel as well as control channels. According to the example embodiments explained below, one or more of the time slots may include one or more Physical Random Access Channels (PRACH) providing one or more RACH occasions in which a UE can transmit a random access preamble. An RNTI can therefore be defined to identify the UE which transmitted the preamble based on the slot and OFDM symbol of the RACH occasion in which the preamble was transmitted.

Conventional Four-Step RACH

In wireless telecommunications networks, such as LTE type networks, there are different Radio Resource Control (RRC) modes for terminal devices. For example, it is common to support an RRC idle mode (RRC IDLE) and an RRC connected mode (RRC CONNECTED). A terminal device in the idle mode may transition to connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

In addition to a terminal device deciding itself to initiate a random access procedure to connect to the network, it is also possible for the network, e.g. a base station, to instruct a terminal device in connected mode to initiate a random access procedure by transmitting to the terminal device an instruction to do so. Such an instruction is sometimes referred to as a PDCCH order (Physical Downlink Control Channel order), see, for example, Section 5.3.3.1.3 in ETSI TS 136 213 V13.0.0 (2016-01)/3GPP TS 36.212 version 13.0.0 Release 13 [7]. There are various scenarios in which a network triggered RACH procedure (PDCCH order) may arise.

Figure 5:
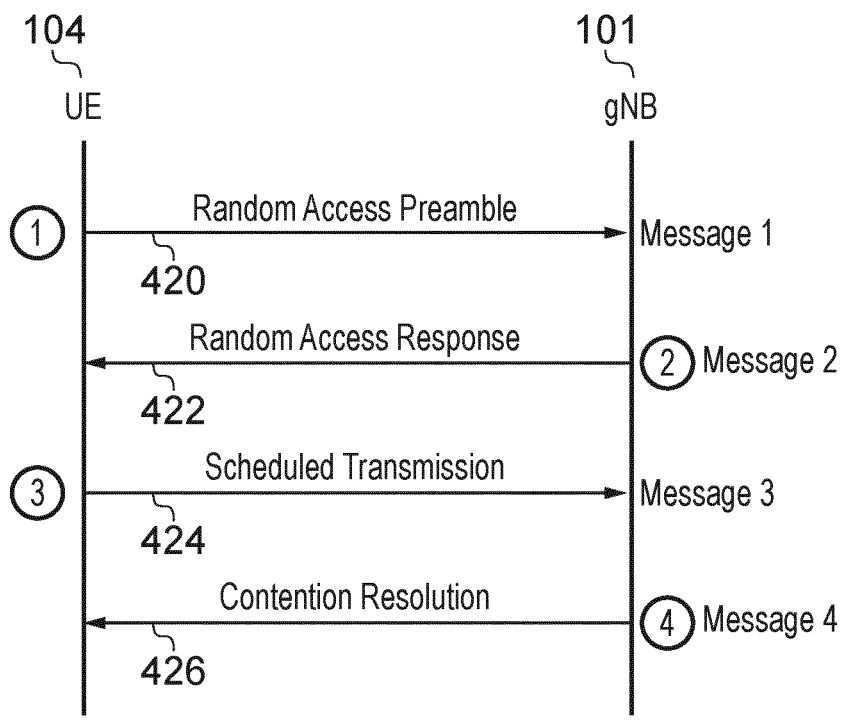
FIG. 5 shows a typical four-step RACH procedure used in LTE systems.

FIG. 5 shows a typical RACH procedure used in LTE systems such as that described by reference to FIG. 1 which could also be applied to an NR wireless communications system such as that described by reference to FIG. 2. A communications device (or UE) 270*b*, which could be in an inactive or idle mode, may have some data which it needs to send to the network. To do so, the UE sends a random access preamble 420 (message 1) to a gNodeB 272. This random access preamble 420 indicates the identity of the communications device 104 to the gNodeB 101, such that the gNodeB 101 can address the communications device 104 during later stages of the RACH procedure. Assuming the random access preamble 420 is successfully received by the gNodeB 101, the gNodeB 101 will transmit a random access response 422 message (message 2) to the communications device 104 based on the identity indicated in the received random access preamble 420. The random access response 422 message carries a further identity which is assigned by the gNodeB 101 to identify the communications device 104, as well as a timing advance value (such that the communications device 104 can change its timing to compensate for the round trip delay caused by its distance from the gNodeB 101) and grant uplink resources for the communications device 104 to transmit the data in.

Following the reception of the random access response message 422, the communications device 104 transmits the scheduled transmission of data 424 to the gNodeB 101 (message 3), using the identity assigned to it in the random access response message 422. Assuming there are no collisions with other UEs, which may occur if another UE and the communications device 104 send the same random access preamble 420 to the gNodeB 101 at the same time and using the same frequency resources, the scheduled transmission of data 424 is successfully received by the gNodeB 101. The gNodeB 101 will respond to the scheduled transmission 424 with a contention resolution message 426 (message 4).

In 5G/NR systems, an "inactive" RRC state may be used, where a UE is able to start data transfer with a low delay in the inactive state without transition to a connected state. Various possible solutions have been proposed to permit this.

Two-Step RACH Procedure

A development to transmit data more quickly for particular applications is known as a two-step RACH [10]. As will be appreciated, compared with the four-step RACH process, the two-step RACH process can provide a facility for transmitting data more quickly. Accordingly it has been proposed to develop general MAC procedures covering both physical layer and higher layer aspects for the two-step RACH process. In general, the benefit of the two-step RACH procedure compared with the four-step PRACH procedure is to reduce the time it takes for connection setup/resume procedure. For example in an ideal situation the two-step RACH will reduce the latency by halving the number of steps from four to two for initial access UEs. In addition, it is considered that a two-step RACH procedure has potential benefits for channel access in NR unlicensed spectrum (NR-U) (see e.g. [11]).

Broadly, the two-step RACH allows the combination of the transmission of the random access preamble 420 with the transmission of data 424 of FIG. 5 as an initial transmission ("Message A" or "MsgA"), and similarly the combination of the transmission of the random access response 422 and contention resolution message 426 as a response ("Message B", or "MsgB").

A fallback procedure may be provided to allow a RACH procedure which is started according to the specifications for a two-step RACH to instead proceed according to the four-step RACH procedure. Two-step RACH may be applicable for communications devices in the RRC_INACTIVE, RRC CONNECTED and RRC IDLE states.

Figure 6:
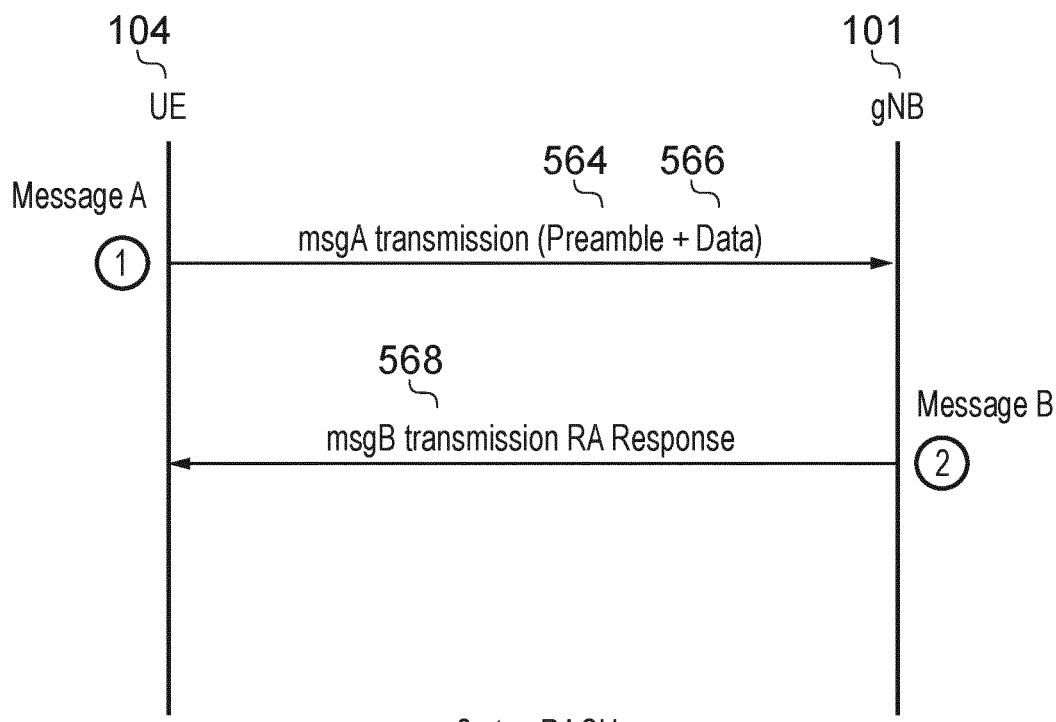
FIG. 6 shows a typical two-step RACH procedure.

A message flow diagram illustrating the two-step RACH process is shown in FIG. 6. As its name suggests, in the two-step RACH process, there are only two steps as follows:

1. The UE 201 transmits a Message A 562 which comprises a RACH preamble 564 and data. The data 566 is transmitted on a shared uplink channel, such as a physical uplink shared channel, PUSCH 566 that in a four-step RACH procedure would be transmitted in Message 3. More specifically the choice of a particular preamble may pre-configure the communications device 104 to transmit the data in pre-configured resources of the uplink shared channel as explained below.

2. The base station 101 having successfully received the Message A 562 responds with a Message B 568 which incorporates both a RAR (message 2) of the four-step RACH procedure and the corresponding data (PDSCH) that in a four-step RACH procedure would be transmitted in Message 4.

Downlink Control Information

Downlink messages (i.e. messages transmitted by the base station 102), such as the Message B (MsgB) or the Message 2, may be preceded by a transmission of downlink control information (DCI) as a resource allocation message to indicate downlink communications resources on which the downlink message is to be transmitted.

A communications device which has recently transmitted either a Message A or a random access request may therefore monitor a downlink control channel on which the DCI may be transmitted. The communications device may determine that the DCI allocates resources for a message transmitted as part of the RACH procedure based on a temporary identity used to encode the DCI. For example, the DCI may be encoded using a random access radio network temporary identity (RA-RNTI), specifically pre-allocated for the purpose of encoding a DCI which allocates resources for a random access response (RAR) message.

If the communications device detects that a DCI has been encoded using the RA-RNTI, then it may proceed to attempt to decode signals transmitted using the communications resources allocated by the DCI to recover the random access response message (e.g. Message B or Message 2).

UE Identity in RACH Procedure

During the RACH procedure (either two-step or four-step), various means may be made to identify a communications device, to avoid the possibility that a communications device considers that a downlink message was intended for it, when in fact the message was intended for or was in response to a different communications device.

With the development of New Radio (NR) for 5G, it has been proposed to enhance the two-step RACH process [10], to assist with and to further develop applications such as the Industrial Internet of Things (IIoT) [12] and an NR-based Access to Unlicensed Spectrum [11]. The enhancements to the two-step RACH process are aimed at specifying general Medium Access Control (MAC) procedures covering both physical layer and higher layer aspects. In general, benefits of the two-step RACH is to reduce a time taken for connection setup/resume procedure, for example in an ideal situation the two-step RACH will reduce the latency by halving the number of steps from 4 to 2 for initial access UEs. It was concluded that a two-step RACH procedure has potential benefits for channel access in NR unlicensed spectrum (NR-U). In addition, two-step RACH procedure has been proposed to enable small data transmissions for UEs in RRC connected mode without UL synchronization as well as UEs in inactive state.

As part of a proposal to enhance the two-step RACH a process followed by the UE and the gNB differs depending on whether the UE already has a Radio Network Terminal Identifier (RNTI). Those acquainted with 3GPP protocols will be aware that there are various RNTIs which are used to identify UEs at various points where the UE needs to be identified during some interaction with the network or performing a protocol. According to one proposal if the UE has an RNTI for the cell in which it is communicating with the gNB, which is a Cell RNTI (C-RNTI) then:

If the UE has a C-RNTI before commencing two-step RACH, the UE must include its C-RNTI in the payload of Message A (msgA), then the UE shall monitor two RNTIs at the same time in the PDCCH scheduling the response message:

for a "success" response the UE should monitor a PDCCH addressed to the C-RNTI for a "not success response" the UE should monitor a PDCCH addressed to the MsgB-RNTI (e.g. a new RNTI)

If the PDCCH addressed to the C-RNTI (i.e. C-RNTI was included in msgA) containing the 12 bit timing advance (TA) command or UL grant if the UE is synchronized already is received, the UE should consider that contention resolution is successful and stop the reception of MsgB.

On the other hand if the UE does not have a C-RNTI then:

Network response to msgA (i.e. MsgB) can include the following: successRAR, fallbackRAR and Backoff Indication (where RAR is a Random Access Response (RAR) message).

The fallbackRAR should contain the following fields: RAPID, UL grant (to retransmit the msgA payload), TC-RNTI and TA command.

The successRAR when CCCH message is included in msgA contains: Contention resolution ID, C-RNTI and TA command.

The successRAR and fallbackRAR are included in the general MsgB format, i.e. successRAR and fallback-RAR can be multiplexed for multiple UEs.

Legacy UEs are not required to decode MsgB. There is therefore a requirement to specify a new RA-RNTI design for MsgB.

A technical problem therefore exists in providing a two-step RACH procedure in which a UE performing the two-step RACH procedure will be able to identify a MsgB using an RNTI, which will not be confused by a legacy or conventional UE if performing a four-step RACH. This is because, whilst it is being proposed to design a new RNTI of MsgB for the two-step RACH, it is assumed that a search space or control channel resources (i.e. PDCCH search space) in the downlink where MsgB and legacy RAR messages are transmitted can be the same for both two-step RACH and four-step RACH. In addition, the uplink PRACH resources (i.e. occasion) for two-step RACH and four-step RACH can be mostly multiplexed either in time domain or frequency domain with Frequency Division Multiplexing (FDM). If time domain multiplexing is employed (i.e. in different time slots), the legacy RNTI for four-step RACH can be also used for two-step RACH because the equation for RNTI includes slot index, therefore there is no issue of RNTI collision or ambiguity, because separating different PRACH transmissions (preamble) will produce different RNTIs in the response. However, for the case of FDM multiplexing or shared PRACH resources on the same slot where starting OFDM symbols are the same, the RNTI collision or ambiguity will occur. Note that in case of shared PRACH resources, the PRACH preambles are portioned into two groups, one for four-step RACH and the other for two-step RACH UEs.

An example illustration of a FDM of a PRACH in which a two-step RACH and a four-step RACH are multiplexed in frequency and so transmitted at the same time is shown in FIG. 6. In FIG. 6 a bandwidth part (BWP) 600 of a wireless access interface is divided in time according to a proposal for NR in which communications resources of the wireless access interface are divided in time into a plurality of time slots, each of which comprises fourteen OFDM symbols 602. Each of the OFDM symbols is given a symbol index 604. The frequency domain is also divided into a plurality of sub-carriers, in this example one hundred, each of which is given a physical resource block ((PRB) index 608. As shown in FIG. 6 the resource of the bandwidth part 600 are divided in frequency in the time slot 602 to provide a first PRACH from PRBs 0, 1 and 2 allocated as a four-step RACH occasion 610 and a second PRACH from PRBs 96, 97, 98 allocated as a two-step RACH occasion 612. As such two different UEs one a conventional or legacy UE and one a NR/5G UE could transmit contemporaneously a PRACH preamble and MsgB respectively. The network therefore needs to respond to both using an RNTI which will be recognised by both unambiguously and not confused with each other. Hence the issue is how to differentiate RNTIs for two-step RACH and four-step RACH when two or more UEs transmit PRACH preambles on the same slot in the uplink for initial access procedure, specifically for FDM multiplexing or shared PRACH resources where starting OFDM symbols are the same for both two-step RACH and four-step RACH on a bandwidth part (BWP) of a cell.

Embodiments of the present technique can provide, on the UE side, a method of operating a communications device in a wireless communications network, the method comprising transmitting a random access message on a wireless access interface, the random access message comprising a selected random access preamble and transmitting uplink data on communications resources of a shared channel, the communications resources of the shared channel being determined from the transmission of the random access message. The method further comprises receiving a resource allocation message comprising an indication of downlink communications resources allocated for the transmission of a random access response message combined with a radio network terminal identifier which identifies the communications device which transmitted the random access message, determining that the resource allocation message identifies the communications device, and in response to determining that the resource allocation message identifies the communications device, receiving and decoding the signals transmitted using the allocated downlink communications resources. The determining that the resource allocation message identifies the communications device comprises calculating the radio network terminal identifier which is used in the resource allocation message to identify the communications device using an offset, and confirming that the calculated radio network terminal identifier corresponds with the radio network terminal identifier present in the resources allocation message.

Embodiments of the present technique can differentiate between RNTIs for two-step RACH and four-step RACH when two or more UEs transmit PRACH preambles on the same slot in the uplink for initial access procedure. In other words, differentiating between legacy RA-RNTI and MsgB-RNTI where both two-step RACH and four-step RACH are supported on the same bandwidth part (BWP) of a cell.

According to one embodiment some un-used RNTIs from legacy RA-RNTI space are used for MsgB-RNTI of two-step RACH. The assumption here is that DCI size for two-step RACH and four-step RACH are same. A conventional or legacy RA-RNTI (compatible for a four-step RACH) is calculated according to the following equation from [14]:

$$RA\text{-}RNTI = 1 + s\_id + 14 \times t\_id + 14 \times 80 \times f\_id + 14 \times 80 \times 8 \times ul\_carrier\_id;$$

where s_id is the index of the first OFDM symbol of the PRACH occasion (0≤s_id≤14), t_id is the index of the first slot of the PRACH occasion in a system frame (0≤t_id≤80), where the subcarrier spacing to determine t_id is based on the value of y specified in subclause 5.3.2 in TS 38.211 (also shown on Table 1 below), f_id is the index of the PRACH occasion in the frequency domain (0≤f_id≤8), and ul_carrier_id is the UL carrier used for Random Access Preamble transmission (0 for NUL carrier, and 1 for SUL carrier).

TABLE 1

Number of OFDM symbols per slot, slots per frame, and slots per subframe for normal cyclic prefix.

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

From the legacy equation, consider an example in which t_id=0, f_id=0 and ul_carrier_id=0. Then the RA-RNTI equation collapses as:

$$RA\text{-}RNTI = 1 + s\_id; \text{ where } 0 \leq s\_id < 14$$

As can be seen from this example embodiment, there are fourteen OFDM symbols in a slot 602 of a PRACH occasion, there are fourteen different RNTIs which can be generated. However, in most of the PRACH configurations, the starting OFDM symbol is only one in every slot/PRACH occasion. This is because the PRACH occasion will typically begin at starting index symbol 0. Examples of possible PRACH occasions are provided for example in Table 6.3.3.2-2 [15]. This means that typically only one RNTI out of fourteen RNTIs in a slot is used or in other words there typically are up to thirteen unused RNTIs in a slot in most of the cases.

Figure 8:
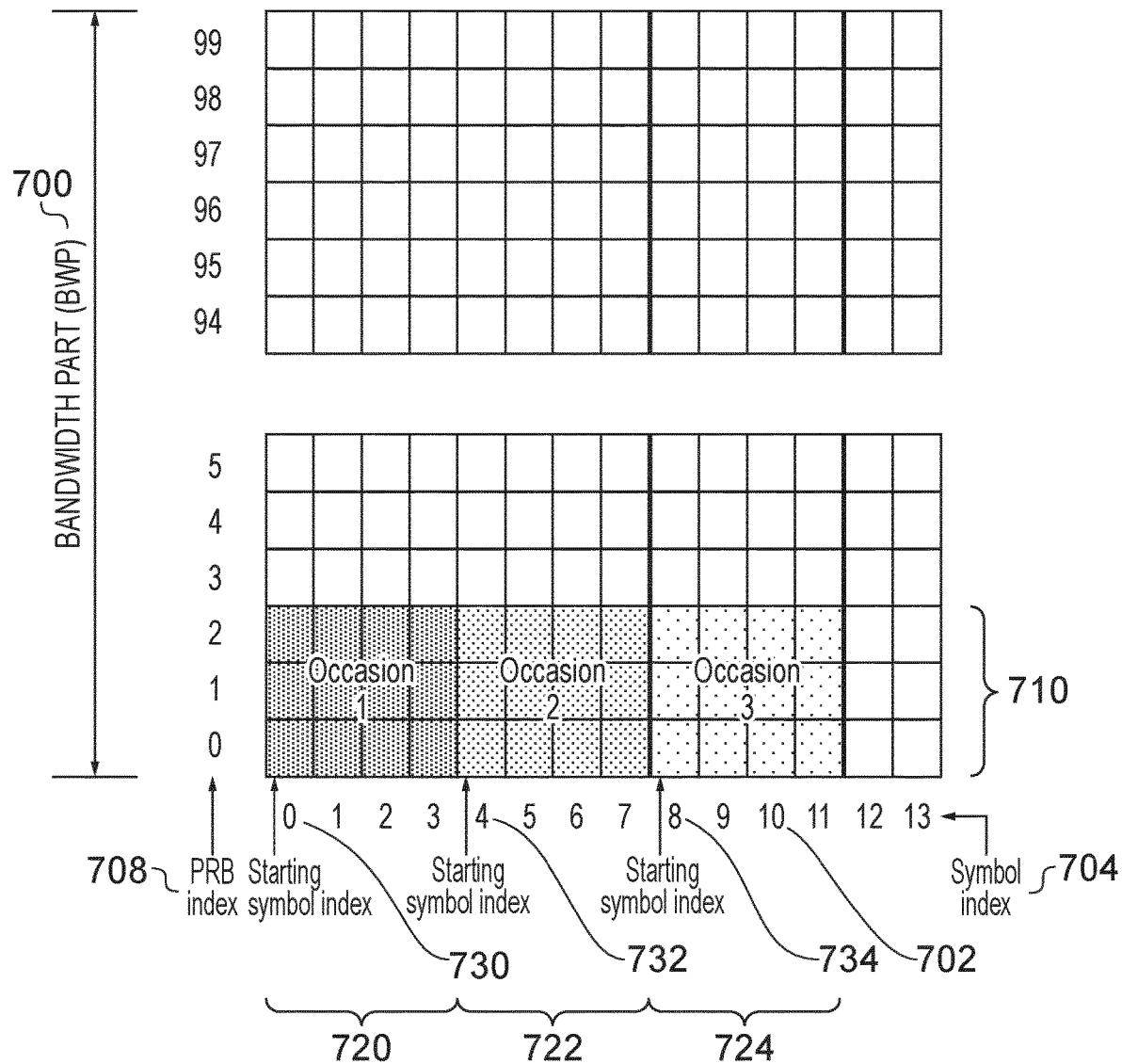
FIG. 8 is a graphical representation illustrating three PRACH occasions in the same time slot for a four-step RACH procedure.

It is also possible to have two or more PRACH occasions on the same slot for four-step RACH with different starting symbols depending on PRACH Configurations, for example see Table 6.3.3.2-4 [15], also illustrated on FIG. 8. FIG. 8 presents a corresponding example to that of FIG. 6, in which a bandwidth part 700 provides time and frequency resources of a wireless access interface in which a time-slot 702 provides fourteen OFDM symbols with a symbols index 704 with sub-carriers having a PRB index 708 numbered 0 to 99. For the example shown in FIG. 8, three PRACH occasions 720, 722, 724 are provided with frequency resources 710 of PRB 0, 1, 2. Each of the three PRACH occasions 720, 722, 724 has a different starting symbol index 730, 732, 734 which will correspondingly generate a different RNTI according to the above equation. However, there are a good number of unused RNTIs in a slot. Embodiments of the present technique therefore use these unused RNTIs for two-step RACH.

Legacy RA-RNTI for four-step RACH cannot be changed due to backward compatibility issues, so there is no need to propose a new RNTI. However, for two-step RACH there is a need to specify a new RA-RNTI design for MsgB. In order to reuse the unused RNTIs in a slot for two-step RACH, an offset is introduced from the starting OFDM symbol of the PRACH occasion for two-step RACH. This offset value is only used in the MsgB-RNTI equation (see below) and the actual starting OFDM symbol of the PRACH resource/occasion for two-step RACH is not changed. That is to say that although the offset is used to generate the RNTI for the two-step RACH, this does not represent an offset in the actual transmission of the Message A.

The offset can be fixed or configurable. If configurable, then in one example the offset for performing a two-step RACH in a cell can be communicated using a broadcast transmission for example in System Information Blocks (SIB). Alternatively, the offset can be UE-specifically signalled if in connected mode for example using RRC signalling.

According to example embodiments both the UE and the gNB of the network infrastructure equipment can both generate the proposed MsgB-RNTI transmitted by the gNB and searched for by the UE according to the following formula:

$$\text{MsgB-RNTI}=1+s\_new\_id+14 \times t+14 \times 80 \times f+14 \times 80 \times 8 \times ul\_carrier\_id$$

where $s\_new\_id=(s\_id+s\_offset)$ modulus 14, and s_offset is an offset value ($0 \leq s\_offset < 14$) from the legacy starting OFDM symbol s_id. All other parameters are same as defined by the legacy equation for RA-RNTI.

According to other alternatives the offset may be calculated as follows:

$s\_new\_id=(s\_id+s\_offset)$ modulus $N_{symb}^{slot}$; where $N_{symb}^{slot}$ is defined in Table 1.

$s\_new\_id=14-(s\_id+1)$;

$s\_new\_id=13-s\_id$;

$s\_new\_id=s\_id+1$;

$s\_new\_id=$ index of the last OFDM symbol of the PRACH occasion.

According to the above equation, for an example in which FDM multiplexing is used for the two-step and the four-step PRACH on the same time slot where starting OFDM symbols are the same for both two-step RACH and four-step RACH, the RNTI generated for two-step RACH will be different due to the offset value introduced and configured for two-step RACH. In this case, the network can decide and configure an offset value such that the MsgB-RNTI for the two-step RACH would be different from RA-RNTI of the four-step RACH. According to this example there are up to thirteen offset values available in each slot.

In another example embodiment some un-used RNTIs from a legacy RA-RNTI space are used to form a MsgB-RNTI for the two-step RACH by adding an offset to a time slot value in the above mentioned formula. According to this example the above formula for calculating the MsgB RNTI is adapted to become:

$$\text{MsgB-RNTI}=1+s\_id+14 \times t\_new\_id+14 \times 80 \times f\_id+14 \times 80 \times 8 \times ul\_carrier\_id;$$

In this formula for the MsgB RNTI, a slot offset t_new_id is adapted to become:

$t\_new\_id=+1$;

$t\_new\_id=t\_id-1$; when $t\_id>0$;

$t\_new\_id=t\_id+t\_offset$; where $t\_offset$ is an offset value ($0 \leq t\_offset < 80$) from the legacy slot with PRACH occasion $t\_id$.

According to this example embodiment an offset to a slot in which the preamble for the RACH process is transmitted is added to the slot in which the preamble was actually transmitted to form an RNTI which will not be confused with an RNTI generated for a UE performing a four step RACH in the same time slot. This is expressed in the above adaptation to the formula for calculating the Message B RNTI (t_new_id).

The slot offset ($0 \leq t\_offset < 80$) may be communicated to the UE in advance. In some examples, the offset can be UE-specifically signalled if in connected mode, for example by RRC signalling. Accordingly, the gNB and UE are synchronized in respect of how to generate the RNTI based on the slot offset signalled to the UE in advance. The UE would simply input the new parameter "t_new_id" into the equation as explained above.

Example embodiments of the present technique can take advantage of used parts of an RNTI space defined in specifications such as those defined by possible PRACH occasions defined for example in TS 38.211 V15.4.0 [15]. This is because it can be observed that not all slots ($0 \leq t\_id < 80$) within a system radio frame have PRACH occasions in most of the PRACH configurations as captured in TS 38.211 V15.4.0 Table 6.3.3.2-2, Table 6.3.3.2-3 and Table 6.3.3.2-4 [15].

Figure 9:
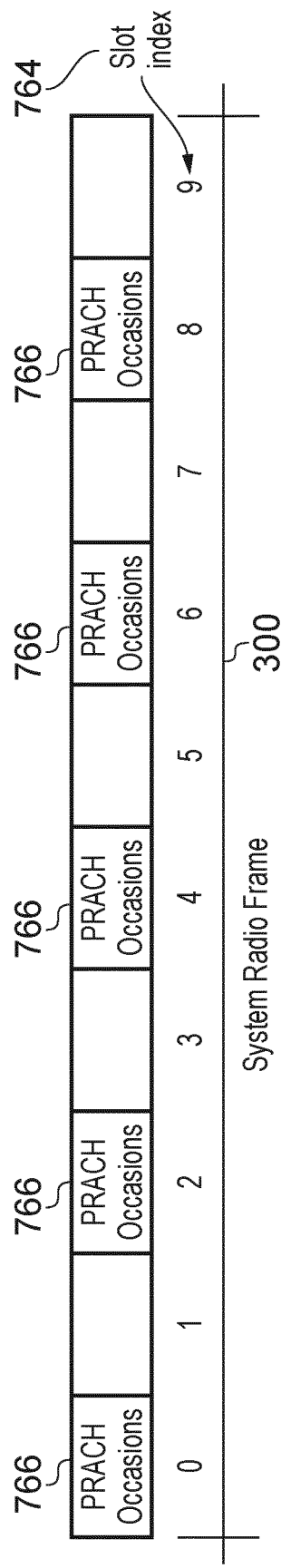
FIG. 9 is a schematic representation of an uplink frame structure corresponding to that shown in FIG. 4 illustrating PRACH occasions in selected slot of a radio frame according to an example configuration.

For example in Table 6.3.3.2-2, PRACH configuration index 25 has slot indices 0, 2, 4, 6, 8 with PRACH occasions as shown in FIG. 9. As shown in FIG. 9 and according to the example PRACH configuration of index 25 in Table 6.3.3.2-2 [15] there are PRACH occasions 766 specified for slots 0, 2, 4, 6, 8 according to the slot index 764 of the radio frame 300, but there are no PRACH occasions for slot indices 1, 3, 5, 7, 9. Accordingly an RNTI can be generated with an offset to point to these slots indices 1, 3, 5, 7, 9 in which there is no PRACH occasion specified. As a result, two UEs, one performing a two-step RACH and another performing a four-step RACH will have different RNTIs generated even if they transmit a RACH preamble in the same PRACH occasion according to this index 25, because the UE performing the two-step RACH will include an offset in the slot index, which points to a slot in which there is no PRACH occasion. Accordingly embodiment of the present technique provide an arrangement for generating an RNTI which is related to a location in the wireless access interface in which a RACH preamble was transmitted but adapted to represent a location where a RACH preamble will not have been transmitted according to specifications for the wireless access interface.

In example embodiments, other parameters in the above equation can also be exploited, for example when some of the values of PRACH frequency-domain index ($0 \leq f\_id < 8$) or uplink carrier index (ul_carrier_id: 0 for NUL carrier, and 1 for SUL carrier) are not used for Contention Based Random Access (CBRA) of a two-step RACH within a cell. An offset off id or ul_carrier_id can be signalled to the UE for generating the RNTI for Contention Free Random Access (CFRA) for a two-step RACH.

Hence, embodiments of the present technique can exploit any one of the parameters (i.e. s_id, t_id, f_id and ul_carrier_id) in the equation above equation for generating the RNTI of Message B or combination of these parameters to generate a different RNTI for CFRA of 2-step RACH than the RNTI for CBRA of 2-step RACH. Embodiments of the present technique can be used to differentiate between CFRA RNTI (contention-free random access) and CBRA RNTI (contention-based random access) regardless of which type of PRACH (2-step or 4-step) a UE performs by employing an offset for a slot index or PRACH frequency domain index or uplink carrier index or combination of these offsets when both (CFRA and CBRA) are supported on the same slot of the same bandwidth part (BWP) of a cell.

Example embodiments therefore provide an arrangement in which different RNTIs can be provided for contemporaneously transmitted preamble/Message A transmissions for MsgB, which does not increase the range of the RNTI-spaces by re-using some of the unused RNTIs within the existing RNTI-space of four-step RACH.

Figure 7:
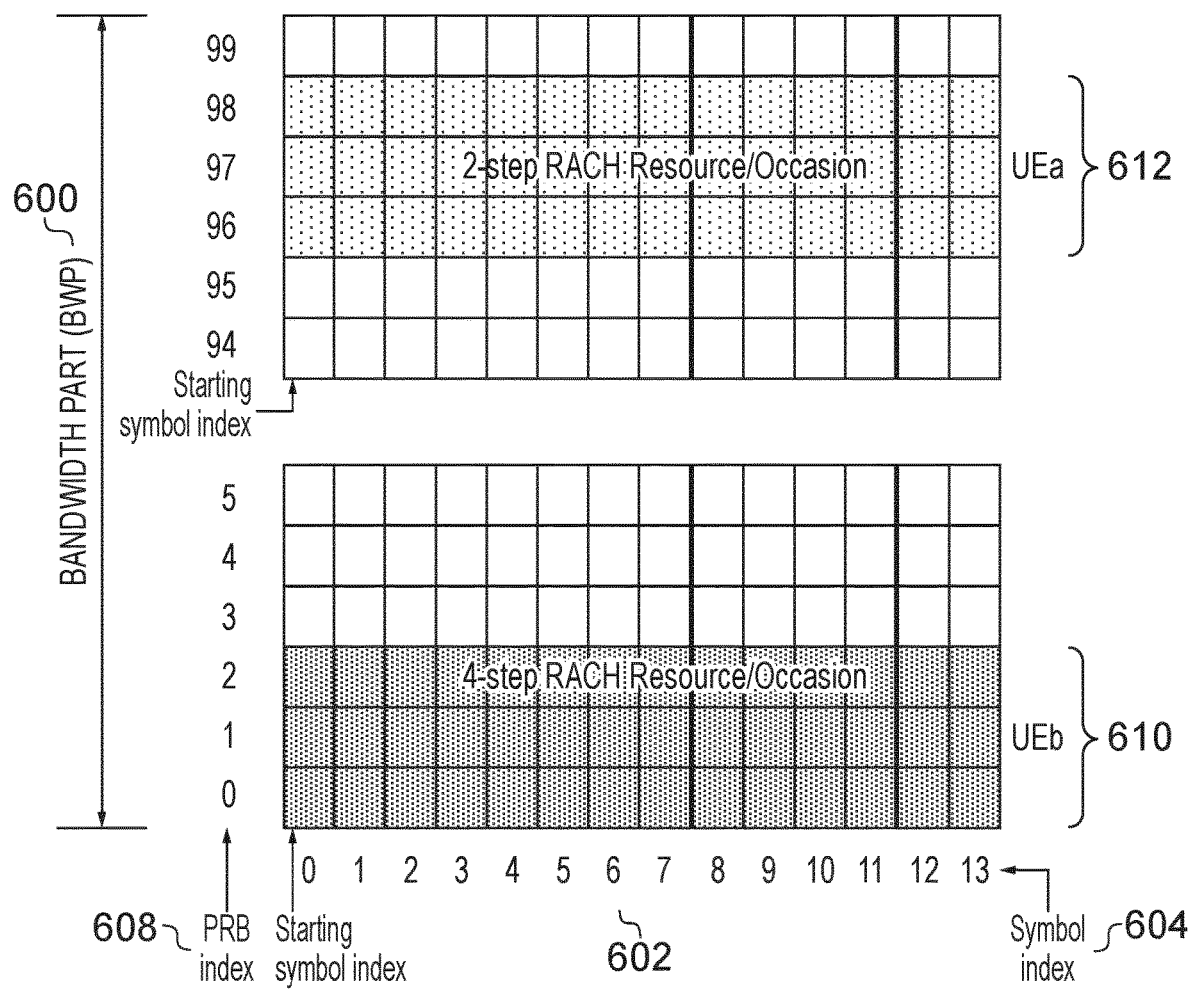
FIG. 7 is a graphical representation illustrating two PRACH occasions in the same slot, one for a two-step RACH procedure and one for a four-step RACH procedure with the same time slot but separated in frequency.
Figure 10:
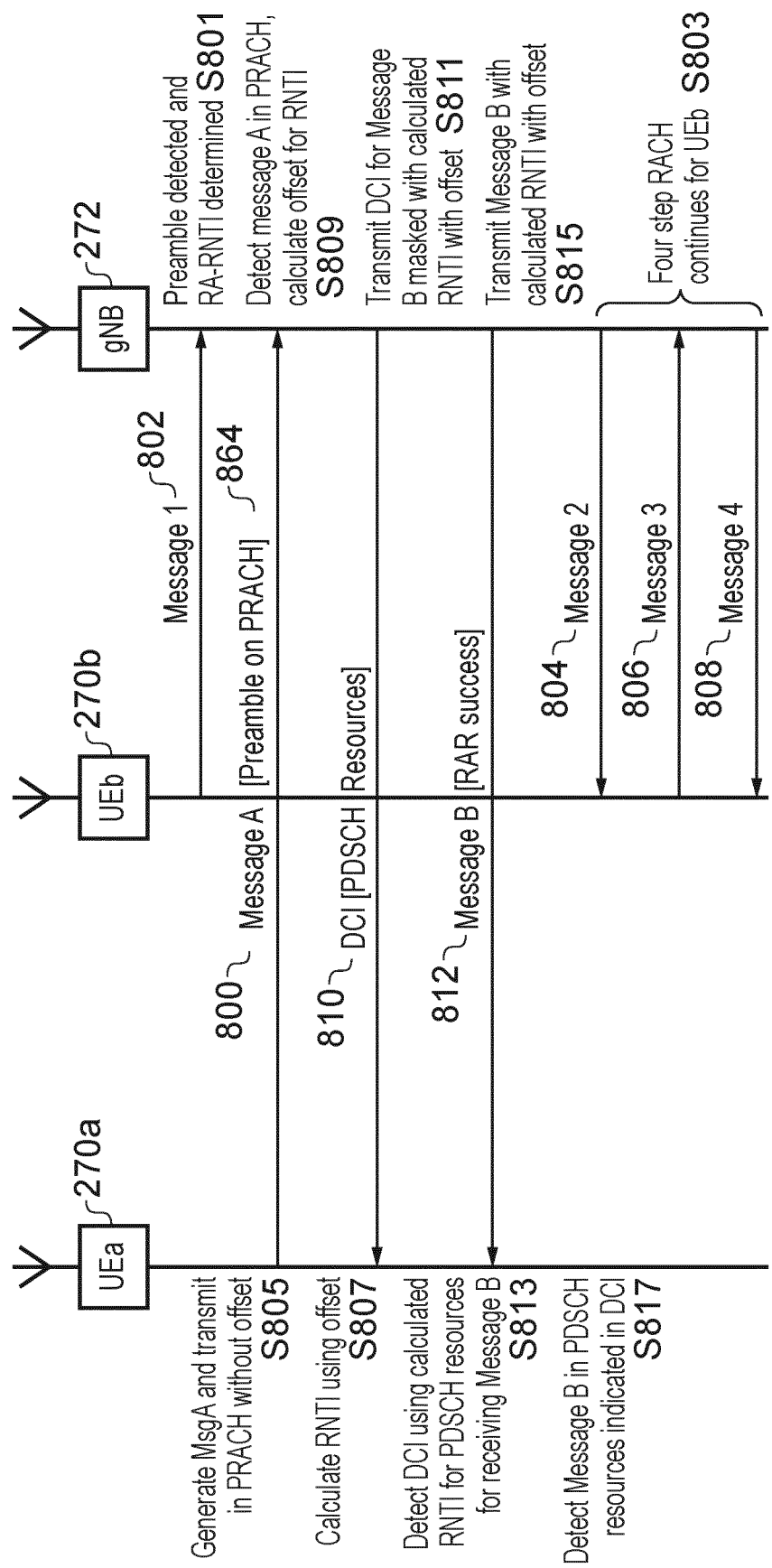
FIG. 10 is a part message part flow diagram illustrating a message exchange and operations performed by communications devices and an infrastructure equipment according to an example embodiment.

FIG. 10 provides a part message exchange diagram part flow diagram illustrating an example embodiment. As for the example shown in FIG. 3, two UEs, UEa 270a, UEb 270b, perform respectively a two-step and four-step RACH process with a gNB 272. As for the example embodiments explained above, the UEa 270a and the UEb 270b transmit respectively a MsgA 800 and a Message 1 802 according to a two-step and four-step RACH processes respectively using frequency multiplexed resources of the same time slot as shown in FIG. 7 for example. For this example the MsgA and Message 1 comprising a preamble both transmit in the PRACH resources of the time slot starting at the same OFDM symbol index.

From the explanation of the example embodiments provided above, it will be appreciated that the UEb 270b performs a conventional four-step RACH by exchanging messages with the gNB 272 as represented as message 1 802, message 2 804, message 3 806 and message 4 808 as illustrated and explained above with reference to FIG. 5 and so a detailed explanation will not be repeated. As will be appreciated however, after receiving the RACH preamble of message 1 802, the gNB 272 in a first process step S801 generates the RA-RNTI according to a conventional operation, which then forms part of the Message 2 804 and continues in step S803 with the four-step random access process. Accordingly operations of the UEb 270b will not be provided in detail because these conform to the legacy or conventional operation as explained with reference to FIG. 5. However it will be appreciated that the RA-RNTI is generated without reference to an RNTI generated for UEa 270a for the two-step RACH which it is performing.

When performing the two-step RACH, UEa 270a generates MsgA 800 in a step S805 and, as explained above, transmits the MsgA 800 in the same time slot at the same starting symbol as the preamble of the Message 1 802 transmitted by the UEb 270b. A conventional way of generating the RNTI would therefore produce the same RNTI as that generated in step S801 and would therefore conflict with the message 2 804 transmitted by the gNB 272 to UEb 270b. According to the example embodiments therefore the UEa 270a in step S807 generates an RNTI based on an offset according to the above equation and the gNB 272 also generates an RNTI according to the same equation using the same offset in step S809. The offset used in steps S807 and S809 may be signalled in advance using either broadcast signalling such as in System Information Blocks (SIB) or using RRC signalling.

Having calculated the RNTI using the offset and the above equation, the gNB 272 generates and transmits in step S811 a DCI for signalling the resources of the PDSCH in which the MsgB will be transmitted. The DCI 810 is masked with the calculated RNTI and transmitted by the gNB 272 in the PDCCH in a search space known to the UEa 270a according to a conventional operation of the two-step RACH process.

The UEa 270a is therefore able in step S813 to detect the DCI 810 indicating the resources of the PDSCH in which the MsgB will be transmitted, using the calculated RNTI with the determined offset. The gNB 272 in step S815 then transmits the MsgB in the resources of the PDSCH indicated by the DCI 810, which is detected by the UEa 270a in step S817.

Although the above proposed solution is tailored for differentiating between MsgB-RNTI for two-step RACH and RA-RNTI for four-step RACH in Rel-16, the concept can be equally applied to the case where there are CFRA (contention-free random access) and CBRA (contention-based random access) resources on the same slot and their starting OFDM symbols are the same. These CFRA and CBRA resources can belong either to four-step RACH or two-step RACH or their combinations on the same bandwidth part (BWP) of a cell. In addition, there are other cases where CBRA and SI request using PRACH resources are configured separately in the same slot on the same BWP of a cell, hence, this concept can be applied as well.

Furthermore, for the case that there are two or more PRACH resources/occasions on the same slot for four-step RACH or if there are two or more PRACH resources/occasions on the same slot for two-step RACH depending on PRACH Configurations, more than one offset value can be configured and broadcasted via system information (SIB) for two-step RACH, possibly one offset for each PRACH resource/occasion.

According to another example embodiment different sizes of DCI can be used for a RAR message of legacy four-step RACH and MsgB of two-step RACH. As the payload of the legacy DCI cannot be changed due to backward compatibility issues, a new DCI format with smaller payload size (i.e. by removing some fields) or larger payload size (i.e. by adding a new set of fields) for two-step RACH can be used according to some example embodiments. This is possible because there are currently up to 16 bits that are not used for the DCI scheduling the RAR message of a conventional four-step RACH. UEs can be configured according to example embodiments with two-step RACH to detect a new shorter DCI format on the PDCCH search space. However, the RNTI will be calculated in accordance with the same technique as with a conventional/legacy four-step RACH.

Figure 11:
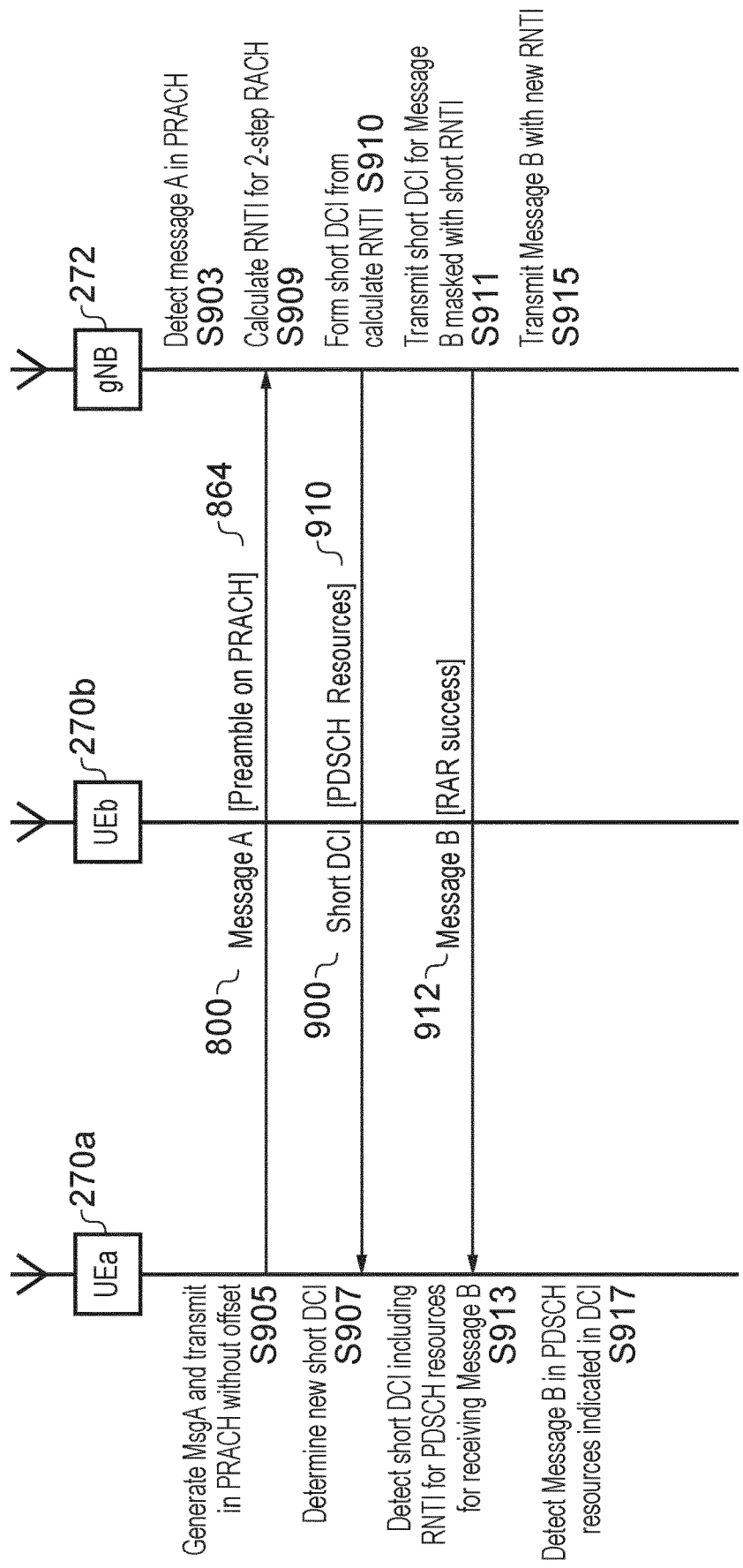
FIG. 11 is a part message part flow diagram illustrating a message exchange and operations performed by communications devices an infrastructure equipment according to another example embodiment.

An example according to this embodiment is illustrated in FIG. 11, which corresponds to the example shown in FIG. 10 and so only the differences will be explained. For example the operation of the second UEb 272b performing the four-step RACH has not been shown in FIG. 11 and will not be repeated although it will be appreciated that a technical problem of separating random access response messages and DCI transmissions using different RNTIs remains the same as that for the embodiment shown in FIG. 10. In FIG. 11 as for the example in FIG. 10, the first UEa 270a generates MsgA 800 in a step S905 and transmits MsgA 800, which includes a preamble 864 and may also include data transmitted in shared resources of the uplink, which represents a transmission of MsgA.

According to this example embodiment the UEa 270a in step S907 generates an RNTI based on a conventional calculation for an RNTI. Correspondingly the gNB 272 after detecting the mMsgA preamble in step S903 also calculates an RNTI in step S909 according to a conventional four-step RACH. The calculation of the RNTI in both the UEa 270a in step S905 and the gNB 272 in step S909 is according to the equation:

$$\text{RA-RNTI} = 1 + s\_id + 14 \times t\_id + 14 \times 80 \times f\_id + 14 \times 80 \times 8 \times ul\_carrier\_id;$$

This equation is explained above. According to this example embodiment this RNTI is then formed into shortened DCI by the gNB 272 in step S910. According to this example the DCI is formed according to a conventional arrangement except that the payload is shortened from 40-bits for example to 30-bits, which is enough to carry the downlink resource allocation which may be 16-bits. A CRC is then generated and both the information payload representing the downlink resource allocation and the CRC are masked with the RNTI. This therefore forms a shortened DCI 900, which includes the resources of the PDSCH 910. The gNB 272 then transmits the shortened DCI in step S911 for signalling the resources of the PDSCH in which the MsgB will be transmitted. The shortened DCI 900 is masked with the calculated RNTI 900 and transmitted by the gNB 272 in the PDCCH in a search space known to the UEa 270*a* according to a conventional operation of the two-step RACH process. The UEa 270*a* is therefore able in step S913 to detect the shortened DCI 910 indicating the resources of the PDSCH in which the MsgB will be transmitted, using the calculated RNTI with the masked on the shortended payload. The gNB 272 in step S915 then transmits the MsgB in the resources of the PDSCH indicated by the DCI 900, which is detected by the UEa 270*a* in step S917.

According to this example embodiment the second UEb 270*b* is unable to detect and decode the shorter DCI 900 and will not be able to detect the RNTI even though it may calculate the same RNTI if both of the UEa 270*a* and UEb 270*b* transmit preambles in the same time slot. This is because the DCI carrying the RNTI has a different size and so the legacy UE will not be able to correctly detect the RNTI because the DCI has a different size from that which it expecting. Since the second UEb 270*b* will not be able to detect the DCI it will not recover the resources of the PDSCH in which the MsgB random access response message is transmitted. Accordingly the RAR messages in Message 2 and MsgB can be separated.

Figure 12:
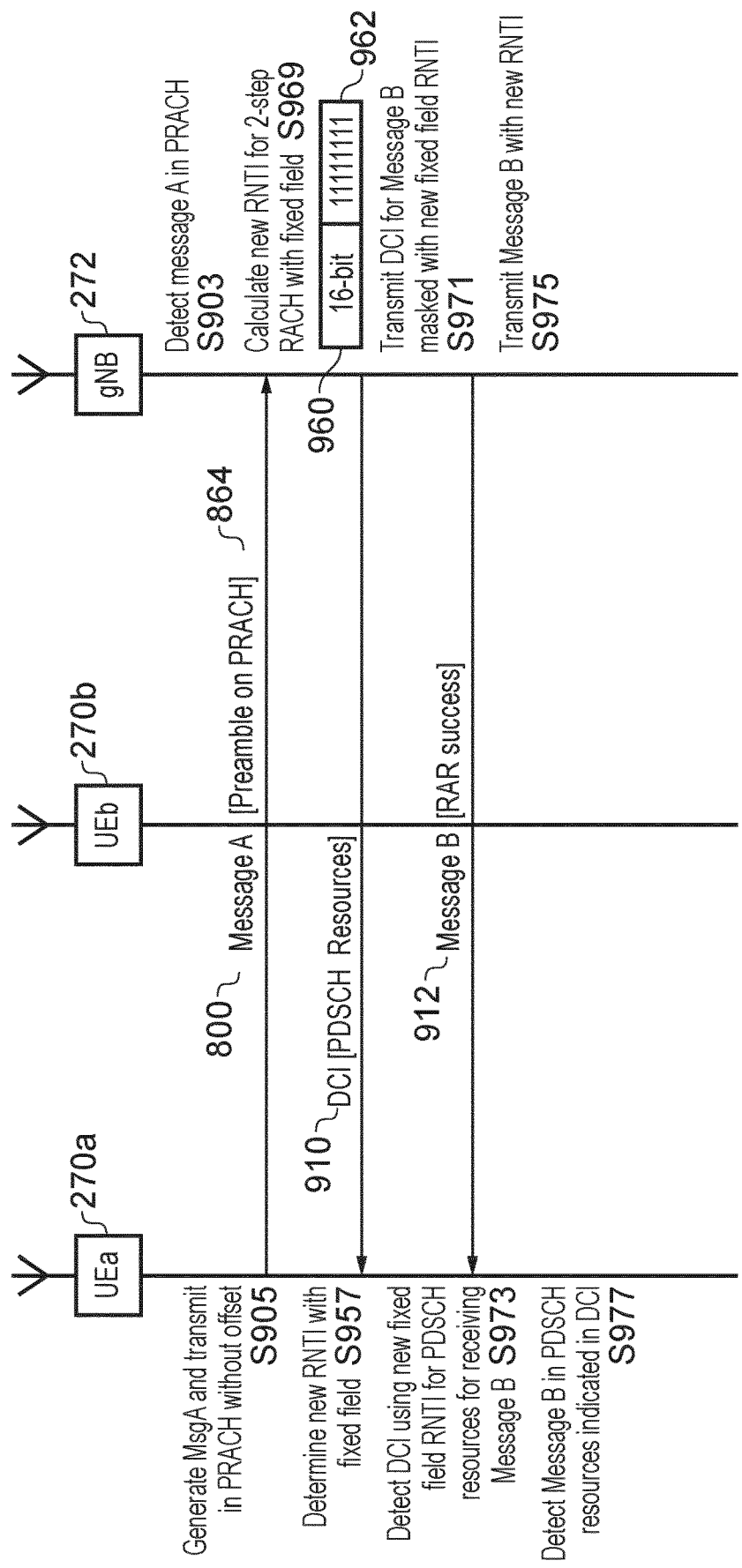
FIG. 12 is a part message part flow diagram illustrating a message exchange and operations performed by communications devices an infrastructure equipment according to another example embodiment.

According to some other example embodiments the gNB and UE are configured to generate an RNTI by appending a bit pattern to the legacy RNTI so that a UE configured to perform a two-step RACH can only decode the DCI scheduling MsgB of two-step RACH. The assumption here is that DCI size for two-step RACH and four-step RACH are same. Currently a length of the RNTI is 16 bits and a CRC checksum is 24 bits for NR. An increase in the length of the RNTI from 16 bits to 24 bits for a two-step RACH by appending a fixed known bit pattern of 8 bits, for example "11111111" can provide an arrangement in which a configured UE which performs the two-step RACH can only use this pattern. As such, legacy UEs will not be able to decode the DCI. This bit pattern is fixed and known in advance between gNB and UEs. An example of this embodiment is shown in FIG. 12, which again corresponds to the examples of FIGS. 8 and 9 and so only the differences will be discussed. As shown in FIG. 12, in step S957 and step S969 the UEa 270*a* and the gNB 272 respectively generate a new fixed field RNTI which comprises a sixteen bit field 960 and a fixed field 962. The fixed field 962 may be eight bits, which may be is as shown or may be another predetermined pattern. It will of course ne appreciated that any number of bits can be used for the fixed field. The 16-bit field can be generated according to the conventional operation as explained above. As for the above examples, the gNB 272 transmits the DCI with the new fixed field RNTI in step S971 and the MsgB 910 in step S975, which is detected by the UEa 270*a* in steps S973 and S977 respectively.

According to this example embodiment the legacy/conventional UEb 270*b* is not able to detect the fixed field RNTI and so cannot decode the DCI or the MsgB transmitted to the UEa 270*a* so that a two-step RACH and a four-step RACH procedures can be separated.

Corresponding communications devices, base stations and methods therefore, and circuitry for a communications device and circuitry for a base station have also been described.

As will be appreciated from the above explanation, example embodiments can provide a method of operating an infrastructure equipment in a wireless communications network, the method comprising receiving a first random access message on a wireless access interface provided by the infrastructure equipment from a first communications device, the first random access message comprising a first random access preamble, receiving uplink data on communications resources of a shared channel from the first communications device, the communications resources of the shared channel being determined from the transmission of the first random access message, receiving a second random access message on a wireless access interface provided by the infrastructure equipment from a second communications device, the second random access message comprising a second random access preamble, transmitting a first resource allocation message to the first communications device, the first resource allocation message comprising an indication of downlink communications resources allocated for the transmission of a first random access response message combined with a first radio network terminal identifier which identifies the first communications device which transmitted the first random access message, transmitting a second resource allocation message to the second communications device, the second resource allocation message comprising an indication of downlink communications resources allocated for the transmission of a second random access response message combined with a second radio network terminal identifier which identifies the second communications device which transmitted the second random access message. The transmitting the first resource allocation message to the first communications device includes calculating a first radio network terminal identifier which is used in the first resource allocation message to identify the communications device using an offset to distinguish the first radio network terminal identifier from a second terminal identifier to identify the second communications device, and transmitting the first resource allocation message to the first communications device.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein.

It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to URLLC/IIoT devices or other low latency communications devices, but can be applied more generally, for example in respect of any type of communications device operating with a wireless link to the communication network.

It will further be appreciated that the principles described herein are applicable not only to LTE-based or 5G/NR-based wireless telecommunications systems, but are applicable for any type of wireless telecommunications system that supports a dynamic scheduling of shared communications resources.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a communications device in a wireless communications network, the method comprising:
  transmitting a random access message on a wireless access interface, the random access message comprising a selected random access preamble,
  receiving a resource allocation message comprising an indication of downlink communications resources allocated for the transmission of a random access response message combined with a radio network terminal identifier which identifies the communications device which transmitted the random access message,
  determining that the resource allocation message identifies the communications device, and
  in response to determining that the resource allocation message identifies the communications device, receiving and decoding the signals transmitted using the allocated downlink communications resources, wherein the determining that the resource allocation message identifies the communications device comprises
  calculating the radio network terminal identifier which is used in the resource allocation message to identify the communications device using an offset, and
  confirming that the calculated radio network terminal identifier corresponds with the radio network terminal identifier present in the resources allocation message.

Paragraph 2. A method according to paragraph 1, wherein the wireless access interface is divided in time into timeslots, each time slot including a plurality of Orthogonal Frequency Division Multiplexed, OFDM, symbols having in the frequency domain a plurality of sub-carriers, and provides a physical random access channel (PRACH) on an uplink carrier in one or more of the time slots, the selected random access preamble being transmitted using time and frequency communications resources corresponding to an occasion of the PRACH, and the calculating the radio network terminal identifier comprises calculating the radio network terminal identifier based on one or more of:
  an index of a first of a plurality of OFDM symbols of a time slot of the PRACH occasion from which the transmission of the selected random access preamble begins, the selected random access preamble occupying a plurality of the OFM symbols,
  an index of a time slot number in which the selected random access preamble was transmitted in a PRACH occasion in a system frame,
  a subcarrier spacing,
  an index of the PRACH occasion in the frequency domain, and
  an uplink carrier used.

Paragraph 3. A method according to paragraphs 1 or 2, wherein the offset is an offset added to one or more of the index of the first of the plurality of OFDM symbols of the time slot of the PRACH occasion from which the transmission of the selected random access preamble begins, the selected random access preamble occupying a plurality of the OFM symbols,
  the index of the time slot number in which the selected random access preamble was transmitted in a PRACH occasion in a system frame, and
  the index of the PRACH occasion in the frequency domain.

Paragraph 4. A method according to paragraphs 1 to 3, wherein the calculating the radio network terminal identifier comprises calculating the radio network terminal identifier by adding the offset to the index of the first of the plurality of OFDM symbols of the time slot of the PRACH occasion from which the transmission of the selected random access preamble begins.

Paragraph 5. A method according to paragraph 4, wherein the offset does not represent a change in the first of the plurality of OFDM symbols from which the transmission of the selected random access preamble begins.

Paragraph 6. A method according to paragraphs 1 to 4, wherein the calculating the radio network terminal identifier comprises calculating the radio network terminal identifier according to the equation:

$$\text{MsgB-RNTI}=1+s\_new\_id+14 \times t\_id+14 \times 80 \times f\_id+14 \times 80 \times 8 \times ul\_carrier\_id,$$

wherein s_new_id=(s_id+s_offset) modulus 14, and s_offset is an offset vale (0≤s_offset<14), s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the uplink carrier used for the selected random access preamble transmission.

Paragraph 7. A method according to paragraph 3, wherein the calculating the radio network terminal identifier comprises calculating the radio network terminal identifier by adding the offset to the index of the slot number identifying a slot of a radio frame of the PRACH occasion in which the selected random access preamble was transmitted.

Paragraph 8. A method according to paragraphs 1 to 7, wherein the offset does not represent a change in the time slot of the radio frame in which the selected random access preamble was transmitted.

Paragraph 9. A method according to paragraphs 1 to 7, wherein the calculating the radio network terminal identifier comprises calculating the radio network terminal identifier according to the equation:

$$\text{MsgB-RNTI}=1+s\_id+14 \times t\_new\_id+14 \times 80 \times f\_id+14 \times 80 \times 8 \times ul\_carrier\_id,$$

wherein t_new_id=t_id+t_offset; where t_offset is an offset value (0≤t_offset<80) from a time slot t_id which is the index of the first slot of the PRACH occasion in a system frame (0≤t_id<80) in which the random access preamble was transmitted, s_id is the index of the first OFDM symbol of the PRACH occasion (0≤s_id<14), f_id is the index of the PRACH occasion in the frequency domain (0≤f_id<8), and ul_carrier_id is the uplink carrier used for the selected random access preamble transmission.

Paragraph 10. A method according to paragraph 9, wherein t_new_id=+1.

Paragraph 11. A method according to paragraph 9, wherein t_new_id=−1; when t_id>0.

Paragraph 12. A method according to paragraphs 1 to 11, wherein the transmitting the random access message on a wireless access interface and the receiving the resource allocation message is in accordance with a two-step random access process and the radio network identifier is a radio network identifier for a Message B of the two-step random access process.

Paragraph 13. A method according to paragraphs 1 to 12, wherein the transmitting the random access message on a wireless access interface and the receiving the resource allocation message is in accordance with a random access process and the radio network identifier is a radio network identifier for a Contention Free Random Access process, CFRA, or a Contention Based Random Access process.

Paragraph 14. A method according to paragraphs 1 to 13, comprising
 receiving the offset by the communications device before the transmitting a random access message.

Paragraph 15. A method according to paragraph 14, wherein the receiving the offset by the communications device comprises
 receiving the offset in a broadcast transmission from an infrastructure equipment of the wireless communications network.

Paragraph 16. A method according to paragraph 14 or 15, wherein the receiving the offset by the communications device comprises
 receiving a plurality of offsets in a broadcast transmission from an infrastructure equipment of the wireless communications network, the communications device being configured to select one of the offsets to generate the radio network terminal identifier for each PRACH occasion.

Paragraph 17. A method according to paragraph 14, 15 or 16, wherein the broadcast transmission in a transmission of a system information block.

Paragraph 18. A method according to paragraph 14, wherein the receiving the offset by the communications device comprises
 receiving the offset from an infrastructure equipment of the wireless communications network when the communications device is in a connected mode.

Paragraph 19. A method according to paragraph 18, wherein the receiving the offset comprises receiving the offset using radio resource communication signalling.

Paragraph 20. A method according to and of paragraphs 1 to 19, comprising after the transmitting the random access message, transmitting uplink data on communications resources of a shared channel, the communications resources of the shared channel being determined from the transmission of the random access message.

Paragraph 21. A method of operating an infrastructure equipment in a wireless communications network, the method comprising
 receiving a first random access message on a wireless access interface provided by the infrastructure equipment from a first communications device, the first random access message comprising a first random access preamble,
 receiving a second random access message on a wireless access interface provided by the infrastructure equipment from a second communications device, the second random access message comprising a second random access preamble,
 transmitting a first resource allocation message to the first communications device, the first resource allocation message comprising an indication of downlink communications resources allocated for the transmission of a first random access response message combined with a first radio network terminal identifier which identifies the first communications device which transmitted the first random access message,
 transmitting a second resource allocation message to the second communications device, the second resource allocation message comprising an indication of downlink communications resources allocated for the transmission of a second random access response message combined with a second radio network terminal identifier which identifies the second communications device which transmitted the second random access message, wherein the transmitting the first resource allocation message to the first communications device includes
 calculating a first radio network terminal identifier which is used in the first resource allocation message to identify the communications device using an offset to distinguish the first radio network terminal identifier from a second terminal identifier to identify the second communications device, and
 transmitting the first resource allocation message to the first communications device.

Paragraph 22. A method of paragraph 21, wherein the wireless access interface is divided in time into timeslots, each time slots including a plurality of Orthogonal Frequency Division Multiplexed, OFDM, symbols having in the frequency domain a plurality of sub-carriers, and provides first and second physical random access channels (PRACH) on an uplink carrier in one or more of the time slots at different frequencies, and the first random access message and the second random access message are received in the same time slot starting at the same OFDM symbol.

Paragraph 23. A method according to paragraphs 21 or 22, wherein the calculating the first radio network terminal identifier comprises calculating the first radio network terminal identifier based on one or more of:
  an index of a first of a plurality of OFDM symbols of the time slot of the first PRACH occasion from which the transmission of the first random access preamble begins, the first random access preamble occupying a plurality of the OFM symbols,
  an index of the time slot number in which the first random access preamble was transmitted in the first PRACH occasion in a system frame,
  a subcarrier spacing,
  an index of the first PRACH occasion in the frequency domain, and
  an uplink carrier used.

Paragraph 24. A method according to paragraphs 21, 22 or 23, wherein the offset is an offset added to one or more of
  the index of the first of the plurality of OFDM symbols of the time slot of the first PRACH occasion from which the transmission of the selected random access preamble begins, the selected random access preamble occupying a plurality of the OFM symbols,
  the index of the time slot number in which the selected random access preamble was transmitted in a first PRACH occasion in a system frame, and
  the index of the first PRACH occasion in the frequency domain.

Paragraph 25. A method according to paragraphs 21 to 24, wherein the calculating the first radio network terminal identifier comprises calculating the first radio network terminal identifier by adding the offset to the index of the index of the first of the plurality of OFDM symbols of the time slot of the first PRACH occasion from which the transmission of the first random access preamble begins.

Paragraph 26. A method according to paragraph 25, wherein the offset does not represent a change in the first of the plurality of OFDM symbols from which the transmission of the first random access preamble begins.

Paragraph 27. A method according to paragraph 25, wherein the calculating the first radio network terminal identifier comprises calculating the first radio network terminal identifier according to the equation:

$$\text{MsgB-RNTI}=1+s\_new\_id+14 \times t\_id+14 \times 80 \times f\_id+14 \times 80 \times 8 \times ul\_carrier\_id,$$

wherein s_new_id=(s_id+s_offset) modulus 14, and s_offset is an offset vale (0≤s_offset<14), s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the uplink carrier used for the selected random access preamble transmission.

Paragraph 28. A method according to paragraphs 24 to 27, wherein the calculating the first radio network terminal identifier comprises calculating the first radio network terminal identifier by adding the offset to the index of the slot number identifying a slot of a radio frame of the PRACH occasion in which the selected random access preamble was transmitted.

Paragraph 29. A method according to paragraph 28, wherein the offset does not represent a change in the time slot of the radio frame in which the first random access message was transmitted.

Paragraph 30. A method according to paragraph 28, wherein the calculating the first radio network terminal identifier comprises calculating the first radio network terminal identifier according to the equation:

$$\text{MsgB-RNTI}=1+s\_id+14 \times t\_new\_id+14 \times 80 \times f\_id+14 \times 80 \times 8 \times ul\_carrier\_id,$$

wherein t_new_id=t_id+t_offset; where t_offset is an offset value (0≤t_offset<80) from a time slot t_id which is the index of the first slot of the PRACH occasion in a system frame (0≤t_id<80) in which the random access preamble was transmitted, s_id is the index of the first OFDM symbol of the PRACH occasion (0≤s_id<14), f_id is the index of the PRACH occasion in the frequency domain (0≤f_id<8), and ul_carrier_id is the uplink carrier used for the selected random access preamble transmission.

Paragraph 31. A method according to paragraph 30, wherein t_new_id=+1.

Paragraph 32. A method according to paragraph 30, wherein t_new_id=−1; when t_id>0.

Paragraph 33. A method according to any of paragraphs 21 to 32, wherein the receiving the first random access message on a wireless access interface, comprises receiving the first random access message from the first communications device according to a two-step random access process, and the receiving the second random access message comprises receiving the second random access message from the second communications device according to a four-step random access process.

Paragraph 34. A method according to paragraphs 21 to 32, wherein the receiving the first random access message on the wireless access interface and the transmitting the first resource allocation message is in accordance with a random access process and the radio network identifier is a radio network identifier for a Contention Free Random Access process, CFRA, or a Contention Based Random Access process.

Paragraph 35. A method according to paragraphs 21 to 32, wherein the receiving the first random access message on a wireless access interface, comprises receiving the first random access message from the first communications device according to a contention free random access process, and the receiving the second random access message comprises receiving the second random access message from the second communications device according to a contention based random access process.

Paragraph 36. A method according to any of paragraphs 21 to 35, comprising
  after the receiving the random access message, receiving uplink data on communications resources of a shared channel from the first communications device, the communications resources of the shared channel being determined from the transmission of the first random access message, Paragraph 37. A method of operating a communications device in a wireless communications network, the method comprising:
  transmitting a random access message on a wireless access interface, the random access message comprising a selected random access preamble in accordance with a two-step random access procedure, receiving a resource allocation message comprising an indication of downlink communications resources allocated for the transmission of a random access response message combined with a radio network terminal identifier which identifies the communications device which transmitted the random access message in accordance with the two-step random access procedure, determining that the resource allocation message identifies the communications device, and in response to determining that the resource allocation message identifies the communications device, decoding the signals transmitted using the allocated downlink communications resources, wherein the determining that the resource allocation message identifies the communications device comprises calculating the radio network terminal identifier which is used in the resource allocation message to identify the communications device based on a time and a frequency when the random access message was transmitted, determining a size of the resource allocation message, which according to the two-step random access procedure is different from the four-step random access procedure, identifying the radio network terminal identifier based on the determined size of the resource allocation message according to the two-step random access procedure, and confirming that the calculated radio network terminal identifier corresponds with the radio network terminal identifier present in the resource allocation message.

Paragraph 38. A method according to paragraph 37, wherein the identifying the radio network terminal identifier based on the determined size of the resource allocation message comprises determining a size of an information carrying payload of the resource allocation message, identifying the radio network terminal identifier from the payload of the resource allocation message of the determined size being masked with the radio network terminal identifier.

Paragraph 39. A method according to paragraph 37 or 38, wherein the wireless access interface is divided in time into timeslots, each time slots including a plurality of Orthogonal Frequency Division Multiplexed, OFDM, symbols having in the frequency domain a plurality of sub-carriers, and provides a physical random access channel (PRACH) on an uplink carrier in one or more of the time slots, the selected random access preamble being transmitted using time and frequency communications resources corresponding to an occasion of the PRACH, and the calculating the radio network terminal identifier based on the time and the frequency when the random access message was transmitted comprises calculating the radio network terminal identifier based on one or more of:

an index of a first of a plurality of OFDM symbols of a time slot of the PRACH occasion from which the transmission of the selected random access preamble begins, the selected random access preamble occupying a plurality of the OFM symbols, an index of a time slot number in which the selected random access preamble was transmitted in a PRACH occasion in a system frame, a subcarrier spacing, an index of the PRACH occasion in the frequency domain, and an uplink carrier used.

Paragraph 40. A method of operating an infrastructure equipment in a wireless communications network, the method comprising receiving a first random access message on a wireless access interface provided by the infrastructure equipment from a first communications device in accordance with a two-step random access procedure, the first random access message comprising a first random access preamble, receiving a second random access message on a wireless access interface provided by the infrastructure equipment from a second communications device in accordance with a four-step random access procedure, the second random access message comprising a second random access preamble, transmitting a first resource allocation message to the first communications device, the first resource allocation message comprising an indication of downlink communications resources allocated for the transmission of a first random access response message combined with a first radio network terminal identifier which identifies the first communications device which transmitted the first random access message, transmitting a second resource allocation message to the second communications device, the second resource allocation message comprising an indication of downlink communications resources allocated for the transmission of a second random access response message combined with a second radio network terminal identifier which identifies the second communications device which transmitted the second random access message, wherein the transmitting the first resource allocation message to the first communications device includes calculating the first radio network terminal identifier which is used in the first resource allocation message to identify the first communications device based on a time and a frequency when the random access message was transmitted, determining a size of the first resource allocation message, which according to the two-step random access procedure is different from the four-step random access procedure, combining the first radio network terminal identifier with the first resource allocation message, and transmitting the first resource allocation message to the first communications device.

Paragraph 41. A method of paragraph 40, wherein the wireless access interface is divided in time into timeslots, each time slots including a plurality of Orthogonal Frequency Division Multiplexed, OFDM, symbols having in the frequency domain a plurality of sub-carriers, and provides first and second physical random access channels (PRACH) on an uplink carrier in one or more of the time slots at different frequencies, and the first random access message and the second random access message are received in the same time slot starting at the same OFDM symbol.

Paragraph 42. A method according to paragraph 40 or 41, wherein the calculating the first radio network terminal identifier comprises calculating the first radio network terminal identifier based on one or more of:

an index of a first of a plurality of OFDM symbols of the time slot of the first PRACH occasion from which the transmission of the first random access preamble begins, the first random access preamble occupying a plurality of the OFM symbols, an index of the time slot number in which the first random access preamble was transmitted in the first PRACH occasion in a system frame, a subcarrier spacing, an index of the first PRACH occasion in the frequency domain, and an uplink carrier used.

Paragraph 43. A method according to paragraph 40, 41 or 42, wherein the combining the first radio network terminal identifier with the first resource allocation message comprises determining a size of an information carrying payload of the first resource allocation message, and masking the payload of the first resource allocation message of the determined size with the first radio network terminal identifier.

Paragraph 44. A method of operating a communications device in a wireless communications network, the method comprising:

transmitting a random access message on a wireless access interface, the random access message comprising a selected random access preamble and in accordance with a two-step random access procedure, receiving a resource allocation message comprising an indication of downlink communications resources allocated for the transmission of a random access response message combined with a radio network terminal identifier which identifies the communications device which transmitted the random access message and in accordance with a two-step random access procedure, determining that the resource allocation message identifies the communications device, and in response to determining that the resource allocation message identifies the communications device, receiving and decoding the signals transmitted using the allocated downlink communications resources, wherein the determining that the resource allocation message identifies the communications device comprises calculating the radio network terminal identifier which is used in the resource allocation message to identify the communications device based on a time and a frequency when the random access message was transmitted, adding to the radio network terminal identifier a fixed field, and confirming that the calculated radio network terminal identifier corresponds with the radio network terminal identifier present in the resources allocation message.

Paragraph 45. A method according to paragraph 44, wherein the wireless access interface is divided in time into timeslots, each time slots including a plurality of Orthogonal Frequency Division Multiplexed, OFDM, symbols having in the frequency domain a plurality of sub-carriers, and provides a physical random access channel (PRACH) on an uplink carrier in one or more of the time slots, the selected random access preamble being transmitted using time and frequency communications resources corresponding to an occasion of the PRACH, and the calculating the radio network terminal identifier based on the time and the frequency when the random access message was transmitted comprises calculating the radio network terminal identifier based on one or more of:

an index of a first of a plurality of OFDM symbols of a time slot of the PRACH occasion from which the transmission of the selected random access preamble begins, the selected random access preamble occupying a plurality of the OFM symbols, an index of a time slot number in which the selected random access preamble was transmitted in a PRACH occasion in a system frame, a subcarrier spacing, an index of the PRACH occasion in the frequency domain, and an uplink carrier used.

Paragraph 46. A method of operating an infrastructure equipment in a wireless communications network, the method comprising receiving a first random access message on a wireless access interface provided by the infrastructure equipment from a first communications device in accordance with a two-step random access procedure, the first random access message comprising a first random access preamble, receiving a second random access message on a wireless access interface provided by the infrastructure equipment from a second communications device in accordance with a four-step random access procedure, the second random access message comprising a second random access preamble, transmitting a first resource allocation message to the first communications device, the first resource allocation message comprising an indication of downlink communications resources allocated for the transmission of a first random access response message combined with a first radio network terminal identifier which identifies the first communications device which transmitted the first random access message, transmitting a second resource allocation message to the second communications device, the second resource allocation message comprising an indication of downlink communications resources allocated for the transmission of a second random access response message combined with a second radio network terminal identifier which identifies the second communications device which transmitted the second random access message, wherein the transmitting the first resource allocation message to the first communications device includes calculating a first radio network terminal identifier which is used in the first resource allocation message to identify the first communications device based on a time and a frequency when the random access message was transmitted, adding to the calculated radio network terminal identifier a fixed field which can be recognised by the first communications device, and transmitting the first resource allocation message to the first communications device.

Paragraph 47. A method of paragraph 46, wherein the wireless access interface is divided in time into timeslots, each time slots including a plurality of Orthogonal Frequency Division Multiplexed, OFDM, symbols having in the frequency domain a plurality of sub-carriers, and provides first and second physical random access channels (PRACH) on an uplink carrier in one or more of the time slots at different frequencies, and the first random access message and the second random access message are received in the same time slot starting at the same OFDM symbol.

Paragraph 48. A method according to paragraph 46 or 47, wherein the calculating the first radio network terminal identifier comprises calculating the first radio network terminal identifier based on one or more of:
- an index of a first of a plurality of OFDM symbols of the time slot of the first PRACH occasion from which the transmission of the first random access preamble begins, the first random access preamble occupying a plurality of the OFM symbols,
- an index of the time slot number in which the first random access preamble was transmitted in the first PRACH occasion in a system frame,
- a subcarrier spacing,
- an index of the first PRACH occasion in the frequency domain, and
- an uplink carrier used.

Paragraph 49. A communications device for communicating in a wireless communications network, the communications device comprising
- transmitter circuitry configured to transmit signals via a wireless access interface provided by the wireless communications network,
- receiver circuitry configured to receive signals transmitted via the wireless access interface, and
- controller circuitry configured with the transmitter circuitry
- to transmit a random access message on a wireless access interface, the random access message comprising a selected random access preamble, and the controller circuitry configured to control the receiver circuitry
- to receive a resource allocation message comprising an indication of downlink communications resources allocated for the transmission of a random access response message combined with a radio network terminal identifier which identifies the communications device which transmitted the random access message, and the controller circuitry is configured with the receiver circuitry
- to determine that the resource allocation message identifies the communications device, and
- in response to determining that the resource allocation message identifies the communications device, to decode the signals transmitted using the allocated downlink communications resources, wherein the controller circuitry is configured to determine that the resource allocation message identifies the communications device by
- calculating the radio network terminal identifier which is used in the resource allocation message to identify the communications device using an offset, and
- confirming that the calculated radio network terminal identifier corresponds with the radio network terminal identifier present in the resources allocation message.

Paragraph 50. An infrastructure equipment for forming part of a wireless communications network, the infrastructure equipment comprising
- transmitter circuitry configured to transmit signals via a wireless access interface,
- receiver circuitry configured to receive signals transmitted via the wireless access interface, and
- controller circuitry configured with the receiver circuitry
- to receive a first random access message on a wireless access interface provided by the infrastructure equipment from a first communications device, the first random access message comprising a first random access preamble, and
- to receive a second random access message on a wireless access interface provided by the infrastructure equipment from a second communications device, the second random access message comprising a second random access preamble, and the controller circuitry is configured with the transmitter circuitry
- to transmit a first resource allocation message to the first communications device, the first resource allocation message comprising an indication of downlink communications resources allocated for the transmission of a first random access response message combined with a first radio network terminal identifier which identifies the first communications device which transmitted the first random access message,
- to transmit a second resource allocation message to the second communications device, the second resource allocation message comprising an indication of downlink communications resources allocated for the transmission of a second random access response message combined with a second radio network terminal identifier which identifies the second communications device which transmitted the second random access message, wherein the controller circuitry is configured with the transmitter circuitry to transmit the first resource allocation message to the first communications device by
- calculating a first radio network terminal identifier which is used in the first resource allocation message to identify the communications device using an offset to distinguish the first radio network terminal identifier from a second terminal identifier to identify the second communications device, and
- transmitting the first resource allocation message to the first communications device.

Paragraph 51. A communications device for communicating in a wireless communications network, the communications device comprising
- transmitter circuitry configured to transmit signals via a wireless access interface provided by the wireless communications network,
- receiver circuitry configured to receive signals transmitted via the wireless access interface, and
- controller circuitry configured with the transmitter circuitry and the receiver circuitry
- to transmit a random access message on a wireless access interface, the random access message comprising a selected random access preamble and in accordance with a two-step random access procedure,
- to receive a resource allocation message comprising an indication of downlink communications resources allocated for the transmission of a random access response message combined with a radio network terminal identifier which identifies the communications device which transmitted the random access message and in accordance with the two-step random access procedure,
- to determine that the resource allocation message identifies the communications device, and
- in response to determining that the resource allocation message identifies the communications device, decoding the signals transmitted using the allocated downlink communications resources, wherein the controller circuitry is configured with the receiver circuitry to determine that the resource allocation message identifies the communications device by
- calculating the radio network terminal identifier which is used in the resource allocation message to identify the communications device based on a time and a frequency when the random access message was transmitted, determining a size of the resource allocation message, which according to the two-step random access procedure is different from the four-step random access procedure, identifying the radio network terminal identifier based on the determined size of the resource allocation message according to the two-step random access procedure, and confirming that the calculated radio network terminal identifier corresponds with the radio network terminal identifier present in the resource allocation message.

Paragraph 52. An infrastructure equipment for forming part of a wireless communications network, the infrastructure equipment comprising transmitter circuitry configured to transmit signals via a wireless access interface, receiver circuitry configured to receive signals transmitted via the wireless access interface, and controller circuitry configured with the receiver circuitry and the transmitter circuitry to receive a first random access message on a wireless access interface provided by the infrastructure equipment from a first communications device in accordance with a two-step random access procedure, the first random access message comprising a first random access preamble, to receive a second random access message on a wireless access interface provided by the infrastructure equipment from a second communications device in accordance with a four-step random access procedure, the second random access message comprising a second random access preamble, to transmit a first resource allocation message to the first communications device, the first resource allocation message comprising an indication of downlink communications resources allocated for the transmission of a first random access response message combined with a first radio network terminal identifier which identifies the first communications device which transmitted the first random access message, and to transmit a second resource allocation message to the second communications device, the second resource allocation message comprising an indication of downlink communications resources allocated for the transmission of a second random access response message combined with a second radio network terminal identifier which identifies the second communications device which transmitted the second random access message, wherein the controller circuitry is configured with the transmitter circuitry to transmit the first resource allocation message to the first communications device by calculating a first radio network terminal identifier which is used in the first resource allocation message to identify the first communications device based on a time and a frequency when the random access message was transmitted, determining a size of the first resource allocation message, which according to the two-step random access procedure is different from the four-step random access procedure, combining the first radio network terminal identifier with the first resource allocation message, and transmitting the first resource allocation message to the first communications device.

Paragraph 53. A communications device for communicating in a wireless communications network, the communications device comprising transmitter circuitry configured to transmit signals via a wireless access interface provided by the wireless communications network, receiver circuitry configured to receive signals transmitted via the wireless access interface, and controller circuitry configured with the transmitter circuitry and the receiver circuitry to transmit a random access message on a wireless access interface, the random access message comprising a selected random access preamble in accordance with a two-step random access procedure, to receive a resource allocation message comprising an indication of downlink communications resources allocated for the transmission of a random access response message combined with a radio network terminal identifier which identifies the communications device which transmitted the random access message in accordance with a two-step random access procedure, to determine that the resource allocation message identifies the communications device, and in response to determining that the resource allocation message identifies the communications device, decoding the signals transmitted using the allocated downlink communications resources, wherein the controller circuitry is configured with the receiver circuitry to determine that the resource allocation message identifies the communications device by calculating the radio network terminal identifier which is used in the resource allocation message to identify the communications device based on a time and a frequency when the random access message was transmitted, adding to the radio network terminal identifier a fixed field, and confirming that the calculated radio network terminal identifier corresponds with the radio network terminal identifier present in the resources allocation message.

Paragraph 54. An infrastructure equipment for forming part of a wireless communications network, the infrastructure equipment comprising transmitter circuitry configured to transmit signals via a wireless access interface, receiver circuitry configured to receive signals transmitted via the wireless access interface, and controller circuitry configured with the receiver circuitry and the transmitter circuitry to receive a first random access message on a wireless access interface provided by the infrastructure equipment from a first communications device in accordance with a two-step random access procedure, the first random access message comprising a first random access preamble, to receive a second random access message on a wireless access interface provided by the infrastructure equipment from a second communications device in accordance with a four-step random access procedure, the second random access message comprising a second random access preamble, to transmit a first resource allocation message to the first communications device, the first resource allocation message comprising an indication of downlink communications resources allocated for the transmission of a first random access response message combined with a first radio network terminal identifier which identifies the first communications device which transmitted the first random access message, to transmit a second resource allocation message to the second communications device, the second resource allocation message comprising an indication of downlink communications resources allocated for the transmission of a second random access response message combined with a second radio network terminal identifier which identifies the second communications device which transmitted the second random access message, wherein the controller circuitry is configured with the transmitter circuitry to transmit the first resource allocation message to the first communications device by calculating a first radio network terminal identifier which is used in the first resource allocation message to identify the first communications device based on a time and a frequency when the random access message was transmitted, adding to the calculated radio network terminal identifier a fixed field which can be recognised by the first communications device, and transmitting the first resource allocation message to the first communications device.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," 3GPP RAN #81.
[2] Holma H. and Toskala A, "LTE for UMTS OFDMA and SC-FDMA based radio access", John Wiley and Sons, 2009
[3] 3GPP TS 38.321, "Medium Access Control (MAC) protocol specification (Rel-15)", v15.3.0
[4] 3GPP TS 38.300 V15.4.0
[5] 3GPP TS 38.321 "NR; Medium Access Control (MAC) protocol specification", version 15.6.0
[6] 3GPP Tdoc R1-1907323 "Procedure for cross-slot scheduling technique", Ericsson
[7] ETSI TS 136 213 V13.0.0 (2016-01)/3GPP TS 36.212 version 13.0.0 Release 13
[8] 3GPP TS 38.212 "NR; Multiplexing and channel coding", version 15.6.0
[9] 3GPP TS 38.214 "NR; Physical layer procedures for data", version 15.6.0
[10] 3GPP document RP-182894, "WID: 2-step RACH for NR," RAN #82
[11] 3GPP document RP-182878, "NR-based Access to Unlicensed Spectrum", RAN #82.
[12] RP-182090, "Revised SID: Study on NR Industrial Internet of Things (IoT)," RAN #81.
[13] TS 38.300 V15.4.0
[14] TS 38.321 V15.4.0
[15] TS 38.211 V15.4.0

What is claimed is:

1. A method of operating a communications device in a wireless communications network, the method comprising:

transmitting a random access message on a wireless access interface, the random access message comprising a selected random access preamble, receiving a resource allocation message comprising an indication of downlink communications resources allocated for the transmission of a random access response message combined with a radio network terminal identifier which identifies the communications device which transmitted the random access message, determining that the resource allocation message identifies the communications device, and in response to determining that the resource allocation message identifies the communications device, receiving and decoding the signals transmitted using the allocated downlink communications resources, wherein the determining that the resource allocation message identifies the communications device comprises:

calculating the radio network terminal identifier which is used in the resource allocation message to identify the communications device using an offset relative to a starting symbol of a physical random access channel (PRACH) occasion, and confirming that the calculated radio network terminal identifier corresponds with the radio network terminal identifier present in the resources allocation message, and wherein the method further comprises receiving a plurality of offsets in a broadcast transmission from an infrastructure equipment of the wireless communications network, the communications device being configured to select one of the offsets to generate the radio network terminal identifier for each PRACH occasion.

2. The method according to claim 1, wherein the wireless access interface is divided in time into timeslots, each time slot including a plurality of Orthogonal Frequency Division Multiplexed (OFDM) symbols having in the frequency domain a plurality of sub-carriers, and provides the PRACH on an uplink carrier in one or more of the time slots, the selected random access preamble being transmitted using time and frequency communications resources corresponding to the PRACH occasion, and the calculating the radio network terminal identifier comprises calculating the radio network terminal identifier based on one or more of:

an index of a first of a plurality of OFDM symbols of a time slot of the PRACH occasion from which the transmission of the selected random access preamble begins, the selected random access preamble occupying a plurality of the OFM symbols, an index of a time slot number in which the selected random access preamble was transmitted in a PRACH occasion in a system frame, a subcarrier spacing, an index of the PRACH occasion in the frequency domain, and an uplink carrier used.

3. The method according to claim 2, wherein the offset is an offset added to one or more of:

the index of the first of the plurality of OFDM symbols of the time slot of the PRACH occasion from which the transmission of the selected random access preamble begins, the selected random access preamble occupying a plurality of the OFM symbols, the index of the time slot number in which the selected random access preamble was transmitted in a PRACH occasion in a system frame, and the index of the PRACH occasion in the frequency domain.

4. The method according to claim 3, wherein the calculating the radio network terminal identifier comprises calculating the radio network terminal identifier by adding the offset to the index of the first of the plurality of OFDM symbols of the time slot of the PRACH occasion from which the transmission of the selected random access preamble begins.

5. The method according to claim 4, wherein the offset does not represent a change in the first of the plurality of OFDM symbols from which the transmission of the selected random access preamble begins.

6. The method according to claim 4, wherein the calculating the radio network terminal identifier comprises calculating the radio network terminal identifier according to the equation:

$$MsgB\text{-}RNTI = 1 + s\_new\_id + 14 \times t\_id + id + 14 \times 80 \times f\_id + 14 \times 80 \times 8 \times ul\_carrier\_id,$$

wherein s_new_id=(s_id+s_offset) modulus 14, and s_offset is an offset vale (0≤s_offset<14), s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the uplink carrier used for the selected random access preamble transmission.

7. The method according to claim 3, wherein the calculating the radio network terminal identifier comprises calculating the radio network terminal identifier by adding the offset to the index of the slot number identifying a slot of a radio frame of the PRACH occasion in which the selected random access preamble was transmitted.

8. The method according to claim 7, wherein the offset does not represent a change in the time slot of the radio frame in which the selected random access preamble was transmitted.

9. The method according to claim 7, wherein the calculating the radio network terminal identifier comprises calculating the radio network terminal identifier according to the equation:

$$MsgB\text{-}RNTI = 1 + s\_id + 14 \times t\_new\_id + 14 \times 80 \times f\_id + 14 \times 80 \times 8 \times ul\_carrier\_id,$$

wherein t_new_id=t_id+t_offset; where t_offset is an offset value (0≤t_offset<80) from a time slot t_id which is the index of the first slot of the PRACH occasion in a system frame (0≤id<80) in which the random access preamble was transmitted, s_id is the index of the first OFDM symbol of the PRACH occasion (0≤s_id<14), f_id is the index of the PRACH occasion in the frequency domain (0≤f_id<8), and ul_carrier_id is the uplink carrier used for the selected random access preamble transmission.

10. The method according to claim 9, wherein t_new_id=t_id+1.

11. The method according to claim 9, wherein t_new_id=t_id−1; when t_id>0.

12. The method according to claim 1, wherein the transmitting the random access message on a wireless access interface and the receiving the resource allocation message is in accordance with a two-step random access process and the radio network identifier is a radio network identifier for a Message B of the two-step random access process.

13. The method according to claim 1, wherein the transmitting the random access message on a wireless access interface and the receiving the resource allocation message is in accordance with a random access process and the radio network identifier is a radio network identifier for a Contention Free Random Access process (CFRA) or a Contention Based Random Access process.

14. The method according to claim 1, wherein the broadcast transmission in a transmission of a system information block.

15. The method according to claim 1, wherein the receiving the offset by the communications device comprises receiving the offset from an infrastructure equipment of the wireless communications network when the communications device is in a connected mode.

16. A communications device for communicating in a wireless communications network, the communications device comprising:
transmitter circuitry configured to transmit signals via a wireless access interface provided by the wireless communications network,
receiver circuitry configured to receive signals transmitted via the wireless access interface, and
controller circuitry configured with the transmitter circuitry
to transmit a random access message on a wireless access interface, the random access message comprising a selected random access preamble, and the controller circuitry configured to control the receiver circuitry
to receive a resource allocation message comprising an indication of downlink communications resources allocated for the transmission of a random access response message combined with a radio network terminal identifier which identifies the communications device which transmitted the random access message, and the controller circuitry is configured with the receiver circuitry:
to determine that the resource allocation message identifies the communications device, and
in response to determining that the resource allocation message identifies the communications device, to decode the signals transmitted using the allocated downlink communications resources,
wherein the controller circuitry is configured to determine that the resource allocation message identifies the communications device by
calculating the radio network terminal identifier which is used in the resource allocation message to identify the communications device using an offset relative to a starting symbol of a physical random access channel (PRACH) occasion, and
confirming that the calculated radio network terminal identifier corresponds with the radio network terminal identifier present in the resources allocation message, and
wherein the controller circuitry is further configured to receive a plurality of offsets in a broadcast transmission from an infrastructure equipment of the wireless communications network, the communications device being configured to select one of the offsets to generate the radio network terminal identifier for each PRACH occasion.

17. An infrastructure equipment for forming part of a wireless communications network, the infrastructure equipment comprising:
transmitter circuitry configured to transmit signals via a wireless access interface,
receiver circuitry configured to receive signals transmitted via the wireless access interface, and controller circuitry configured with the receiver circuitry:
- to receive a first random access message on a wireless access interface provided by the infrastructure equipment from a first communications device, the first random access message comprising a first random access preamble, and
- to receive a second random access message on a wireless access interface provided by the infrastructure equipment from a second communications device, the second random access message comprising a second random access preamble, and the controller circuitry is configured with the transmitter circuitry:
- to transmit a first resource allocation message to the first communications device, the first resource allocation message comprising an indication of downlink communications resources allocated for the transmission of a first random access response message combined with a first radio network terminal identifier which identifies the first communications device which transmitted the first random access message,
- to transmit a second resource allocation message to the second communications device, the second resource allocation message comprising an indication of downlink communications resources allocated for the transmission of a second random access response message combined with a second radio network terminal identifier which identifies the second communications device which transmitted the second random access message,
- wherein the controller circuitry is configured with the transmitter circuitry to transmit the first resource allocation message to the first communications device by
- calculating a first radio network terminal identifier which is used in the first resource allocation message to identify the communications device using an offset relative to a starting symbol of a physical random access channel (PRACH) occasion to distinguish the first radio network terminal identifier from a second terminal identifier to identify the second communications device, and
- transmitting the first resource allocation message to the first communications device, and
- wherein the controller circuitry is further configured to transmit a plurality of offsets in a broadcast transmission to the first communications device to cause the first communications device to select one of the offsets to generate the radio network terminal identifier for each PRACH occasion.

* * * * *